United States Patent
Mah et al.

(10) Patent No.: US 12,480,840 B1
(45) Date of Patent: Nov. 25, 2025

(54) AUTOMATIC HIGH PRECISION BATTERY MATERIAL ASSESSMENT SYSTEM

(71) Applicant: MAG IA, INC., Austin, TX (US)

(72) Inventors: Jongwook Mah, Austin, TX (US); Soyeon Choo, Cheongju-si (KR); Donghwan Mah, Austin, TX (US); Kwangwoo Park, Cheongju-si (KR)

(73) Assignee: Mag IA, Inc., Austin, TX (US)

( * ) Notice: Subject to any disclaimer, the term of this patent is extended or adjusted under 35 U.S.C. 154(b) by 0 days.

(21) Appl. No.: 19/025,035

(22) Filed: Jan. 16, 2025

Related U.S. Application Data

(63) Continuation of application No. PCT/US2024/050393, filed on Oct. 8, 2024.
(Continued)

(51) Int. Cl.
  *G01N 1/04* (2006.01)
  *G01N 33/00* (2006.01)

(52) U.S. Cl.
  CPC ........... *G01N 1/04* (2013.01); *G01N 33/0091* (2024.05)

(58) Field of Classification Search
  CPC .............................. G01N 1/04; G01N 33/0091
  See application file for complete search history.

(56) References Cited

U.S. PATENT DOCUMENTS

| | | |
|---|---|---|
| 4,781,298 A | 11/1988 | Hemstock |
| 6,448,092 B1 | 9/2002 | Tuunanen |

(Continued)

FOREIGN PATENT DOCUMENTS

| | | |
|---|---|---|
| CN | 102235950 A | 11/2011 |
| CN | 103243339 A | 8/2013 |

(Continued)

OTHER PUBLICATIONS

PCT/US2023/076000, filed on Oct. 4, 2023 by Mag IA LLC, not yet published, 49 pages.

(Continued)

*Primary Examiner* — Walter L Lindsay, Jr.
*Assistant Examiner* — Milton Gonzalez
(74) *Attorney, Agent, or Firm* — Definitive Patents member Synchrony IP; Timothy D. Snowden; Yau H. Chan

(57) ABSTRACT

Apparatus and associated methods relate to evaluating impurity content in battery materials. In an illustrative example, a battery material impurity assessment system (BMIAS) may include a slurry mixing system and an impurity extraction system (IES). The slurry mixing system, for example, may include a motor configured to rotate a vertical axis of a slurry container. For example, the motor may pause a movement of the slurry container when the vertical axis is rotated at a predetermined angle. For example, the IES may include a translatable magnetic mass (TMM) enclosed within a sheath. For example, by operating a position of the TMM, the IES may release non-target impurity and retain target substances. In some implementations, the target substance may be ionized by an acid treatment solution rapidly without direct heating. In some implementations, the target substances may be dispersed on a conductive filter to be directly used in subsequent analysis. Various embodiments may advantageously rapid high precision and rapid impurity testing for battery manufacturing.

28 Claims, 22 Drawing Sheets

Related U.S. Application Data

(60) Provisional application No. 63/699,570, filed on Sep. 26, 2024, provisional application No. 63/683,620, filed on Aug. 15, 2024.

(56) References Cited

U.S. PATENT DOCUMENTS

| | | | |
|---|---|---|---|
| 6,649,419 | B1 | 11/2003 | Anderson |
| 8,372,341 | B2 | 2/2013 | Walsh |
| 8,454,825 | B2 | 6/2013 | Griebel |
| 9,597,645 | B2 | 3/2017 | Takenaka et al. |
| 11,293,935 | B2 | 4/2022 | Konishi et al. |
| 2003/0127396 | A1 | 7/2003 | Siddiqi |
| 2010/0288705 | A1 | 11/2010 | Griebel |
| 2011/0198294 | A1 | 8/2011 | Sharpe |
| 2013/0256198 | A1 | 10/2013 | Ellis |
| 2016/0121341 | A1 | 5/2016 | Urick |
| 2016/0370279 | A1 | 12/2016 | Min |
| 2018/0358156 | A1 | 12/2018 | Fujimoto |
| 2020/0047189 | A1 | 2/2020 | Mackenzie et al. |
| 2020/0179942 | A1 | 6/2020 | Chang |
| 2020/0393474 | A1 | 12/2020 | Oishi |
| 2022/0251681 | A1 | 8/2022 | Rohde |
| 2023/0234008 | A1 | 7/2023 | Hattori et al. |
| 2023/0241625 | A1 | 8/2023 | Jenne |
| 2023/0283217 | A1 | 9/2023 | Naydenov et al. |
| 2024/0173723 | A1 | 5/2024 | Wang |
| 2024/0293854 | A1 | 9/2024 | Guo |
| 2024/0410847 | A1* | 12/2024 | Tahara ............... H01M 4/04 |

FOREIGN PATENT DOCUMENTS

| | | |
|---|---|---|
| CN | 203400661 U | 1/2014 |
| CN | 105510096 A | 4/2016 |
| CN | 105628727 A | 6/2016 |
| CN | 106902542 A | 6/2017 |
| CN | 106902542 B | 6/2017 |
| CN | 110567999 A | 12/2019 |
| CN | 211659790 U | 10/2020 |
| CN | 112697550 A | 4/2021 |
| CN | 113670689 A | 11/2021 |
| CN | 114966121 A | 8/2022 |
| CN | 217411080 U | 9/2022 |
| CN | 115343276 A | 11/2022 |
| CN | 217855775 U | 11/2022 |
| CN | 218854556 U | 4/2023 |
| CN | 218917112 U | 4/2023 |
| CN | 218924959 U | 4/2023 |
| CN | 116482025 A | 7/2023 |
| CN | 116664957 A | 8/2023 |
| CN | 116727104 A | 9/2023 |
| CN | 117147604 A | 12/2023 |
| CN | 117761094 A | 3/2024 |
| CN | 117805153 A | 4/2024 |
| CN | 220893857 U | 5/2024 |
| CN | 118603693 A | 9/2024 |
| CN | 118603703 A | 9/2024 |
| CN | 221934196 U | 11/2024 |
| CN | 221981770 U | 11/2024 |
| CN | 222034501 U | 11/2024 |
| CN | 119246176 A | 1/2025 |
| CN | 222365446 U | 1/2025 |
| CN | 222490434 U | 2/2025 |
| CN | 119618960 A | 3/2025 |
| CN | 119857701 A | 4/2025 |
| CN | 120132752 A | 6/2025 |
| CN | 120178366 A | 6/2025 |
| CN | 120204994 A | 6/2025 |
| CN | 120352300 A | 7/2025 |
| CN | 120389038 A | 7/2025 |
| CN | 223144922 U | 7/2025 |
| CN | 120400865 A | 8/2025 |
| DE | 102020212466 A1 | 4/2022 |
| EP | 2834010 B1 | 12/2017 |
| FI | 121322 B | 4/1997 |
| GB | 2623420 A | 4/2024 |
| GB | 2624499 A | 5/2024 |
| JP | H0338236 A | 2/1991 |
| JP | H05192605 A | 8/1993 |
| KR | 101666924 B1 | 10/2016 |
| KR | 20160131398 A | 11/2016 |
| KR | 102162083 B1 | 10/2020 |
| KR | 102686288 B1 | 7/2024 |
| KR | 102743834 B1 | 12/2024 |
| KR | 2025-0014600 A | 2/2025 |
| TW | M597180 U | 6/2020 |
| WO | 1987005536 A1 | 9/1987 |
| WO | 2019022347 A1 | 1/2019 |
| WO | 2022261242 A1 | 12/2022 |
| WO | 2022270393 A1 | 12/2022 |
| WO | 2023123621 A1 | 7/2023 |
| WO | 2023213839 | 11/2023 |
| WO | 2023231156 A1 | 12/2023 |
| WO | 2024155693 A1 | 7/2024 |
| WO | 2025000744 A1 | 1/2025 |
| WO | 2025026427 A1 | 2/2025 |

OTHER PUBLICATIONS

Intermediate Written Opinion mailed Jul. 11, 2025, issued by the European Patent Office in PCT/US2023/076000, 14 pages.

International Invitation to Pay Additional Fees Accompanying Results of Partial International Search and Provisional Opinion received Apr. 25, 2025, issued by the European Patent Office in PCT/US2024/050393, 16 pages.

International Search Report and Written Opinion received Jul. 23, 2025, issued by the European Patent Office in PCT/US2024/050393, 35 pages.

International Search Report and Written Opinion mailed Jul. 19, 2024, issued by the European Patent Office in PCT/US2023/076000, 17 pages.

Office Action (Notice of Allowance and Fees Due (PTOL-85)) dated Aug. 19, 2025 for U.S. Appl. No. 19/023,867 (pp. 1-8).

Applicant Amendments and Remarks in response to intermediate Written Opinion in PCT/US2023/076000, filed Sep. 11, 2025, 20 pages.

Examiner minutes of Oral Consultation in PCT/US2023/076000, received Aug. 13, 2025, including Applicant Chapter II Demand Brief and Examiner intermediate Written Opinion for context, 36 pages.

* cited by examiner

AUTOMATIC HIGH PRECISION BATTERY MATERIAL ASSESSMENT SYSTEM

CROSS-REFERENCE TO RELATED APPLICATIONS

This application claims the benefit of, under 35 USC § 119, Korean Patent Application Serial No. 10-2024-0102462, titled "Sample Impurity Collection Device and Sample Impurity Collection Method for Spectroscopy and Optical Analysis," filed by Jongwook Mah, et al., on Aug. 1, 2024; Korean Patent Application Serial No. 10-2024-0102463, titled "Source Material Stirring Device for Separating Magnetic and Non-Magnetic Impurities and Source Material Stirring Method," filed by Jongwook Mah, et al., on Aug. 1, 2024; and Korean Patent Application Serial No. 10-2024-0107324, titled "METHOD FOR COLLECTING MAGNETIC AND NON-MAGNETIC IMPURITIES FROM POWDER SOURCE MATERIAL AND METHOD FOR PREPARING COLLECTED IMPURITIES AS SAMPLES FOR ANALYSIS," filed by Jongwook Mah, et al., on Aug. 13, 2024.

This application is a national stage application under 35 U.S.C. 371 of and claims the benefit of PCT/US2024/050393, titled "AUTOMATIC HIGH PRECISION BATTERY MATERIAL ASSESSMENT SYSTEM," filed by MAG IA, INC. on Oct. 8, 2024. This application also claims the benefit of U.S. Provisional Application Ser. No. 63/683,620, titled "ELECTRODE PURIFICATION," filed by Jongwook Mah, et al., on Aug. 15, 2024, and U.S. Provisional Application Ser. No. 63/699,570, titled "AUTOMATIC HIGH PRECISION BATTERY MATERIAL ASSESSMENT SYSTEM" filed by Jongwook Mah, on Sep. 26, 2024.

This application incorporates the entire contents of the foregoing application(s) herein by reference.

The subject matter of this application may have common inventorship with and/or may be related to the subject matter of the following:
- U.S. Application Ser. No. 63/624,184, titled "MODULAR MAGNETIC IMPURITIES COLLECTION," filed by Kang Wook Shin, et al., on Jan. 23, 2024;
- U.S. Application Serial No. PCT/US2023/076000, titled "AUTOMATIC MAGNETIC IMPURITY SAMPLE ISOLATION," filed by Jongwook Mah, et al., on Oct. 4, 2023;
- U.S. Application Ser. No. 63/520,097, titled "HIGH-PRECISION MAGNETIC PARTICLE COLLECTOR," filed by Jongwook Mah, et al., on Aug. 17, 2023; and
- U.S. Application Ser. No. 63/583,138, titled "AUTOMATIC MAGNETIC IMPURITY SAMPLE ISOLATION," filed by Jongwook Mah, et al., on Sep. 15, 2023.

This application incorporates the entire contents of the foregoing application(s) herein by reference.

TECHNICAL FIELD

Various embodiments relate generally to impurities in electrode materials.

BACKGROUND

Battery technology has become a critical focus in the automotive industry due to the global push toward sustainable energy solutions. For example, some batteries may include several primary components (e.g., cathodes, anodes, electrolytes, separators, current collectors). The materials used in these components (e.g., lithium-based metal oxides for cathodes, graphite for anodes) may be required to meet stringent standards to ensure long-term performance and safety.

In the context of EV battery manufacturing, bulk electrode materials may include magnetic impurities, for example. Metals (e.g., iron, nickel, cobalt) and/or alloy (e.g., stainless steel) may be present in ferromagnetic states. These magnetic impurities may, for example, be of particular concern due to their potential to interfere with the battery's internal magnetic fields. For example, impurities may interfere with the chemical reactions in the battery, causing poor performance and safety issues. As an illustrative example, the magnetic impurities may lead to localized heating, reduced battery efficiency, or safety risks like thermal runaway. For example, these impurities may be nanometer-sized and have extremely low concentrations at parts per billion (ppb).

SUMMARY

Apparatus and associated methods relate to evaluating impurity content in battery materials. In an illustrative example, a battery material impurity assessment system (BMIAS) may include a slurry mixing system and an impurity extraction system (IES). The slurry mixing system, for example, may include a motor configured to rotate a vertical axis of a slurry container. For example, the motor may pause a movement of the slurry container when the vertical axis is rotated at a predetermined angle. For example, the IES may include a translatable magnetic mass (TMM) enclosed within a sheath. For example, by operating a position of the TMM, the IES may release non-target impurity and retain target substances. In some implementations, the target substance may be ionized by an acid treatment solution rapidly without direct heating. In some implementations, the target substances may be dispersed on a conductive filter to be directly used in subsequent analysis. Various embodiments may advantageously rapid high precision and rapid impurity testing for battery manufacturing.

Various embodiments may achieve one or more advantages. For example, some embodiments may advantageously mix the mixture uniformly without precipitates. Some embodiments may, for example, advantageously remove a gravitational bottom of the mixture. For example, some embodiments may minimize adhesion of the battery materials to the slurry container. Some embodiments may, for example, advantageously generate a homogenization of the slurry. For example, some embodiments may advantageously break large particles (such as secondary or tertiary particles) into small particles (primary particles). Some embodiments may, for example, advantageously facilitate very small particles at the nanometer and ppm level to advantageously be separated in subsequent processing. For example, some embodiments may advantageously remove a need for a separate process of removing any magnetic material directly captured on the magnetic mass. Some embodiments may advantageously improve an accuracy for capturing the target magnetic impurity. For example, some embodiments may advantageously reduce capillary action and allow rapid drying to remove additional contaminants. Some embodiments may, for example, reduce static electricity to prevent fine particles from clumping together or sticking to the equipment. For example, some embodiments may advantageously dissolve the target substances (e.g., magnetic impurities) safely without excessive heating. Some embodiments may, for example, advantageously reduce contamination. For example, some embodiments may advantageously increase particle retention rate. Some embodiments may advantageously enable more accurate and clearer images to be obtained during a (subsequent) SEM analysis. For example, some embodiments may advantageously capture non-magnetic impurities alloys.

The details of various embodiments are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF ILLUSTRATIVE EMBODIMENTS

To aid understanding, this document is organized as follows. First, to help introduce discussion of various embodiments, a rapid high precision impurity assessment system (RHPIAS) is introduced with reference to FIGS. 1-3. Second, that introduction leads into a description with reference to FIGS. 4A-5 of some exemplary embodiments of a battery slurry mixing module. Third, with reference to FIGS. 6-7C and 10, various devices useful for impurity extraction are described in application to exemplary RHPIAS. Fourth, with reference to FIGS. 8-9, the discussion turns to exemplary embodiments that illustrate a target impurity filtration unit. Fifth, and with reference to FIG. 11-16, this document describes exemplary apparatus and methods useful for sampling and testing battery material accurately and rapidly. Sixth, the document introduces a sonication device useful for target impurity extraction with reference to FIGS. 17-18. Finally, the document discusses further embodiments, exemplary applications and aspects relating to RHPIAS.

Figure 1:
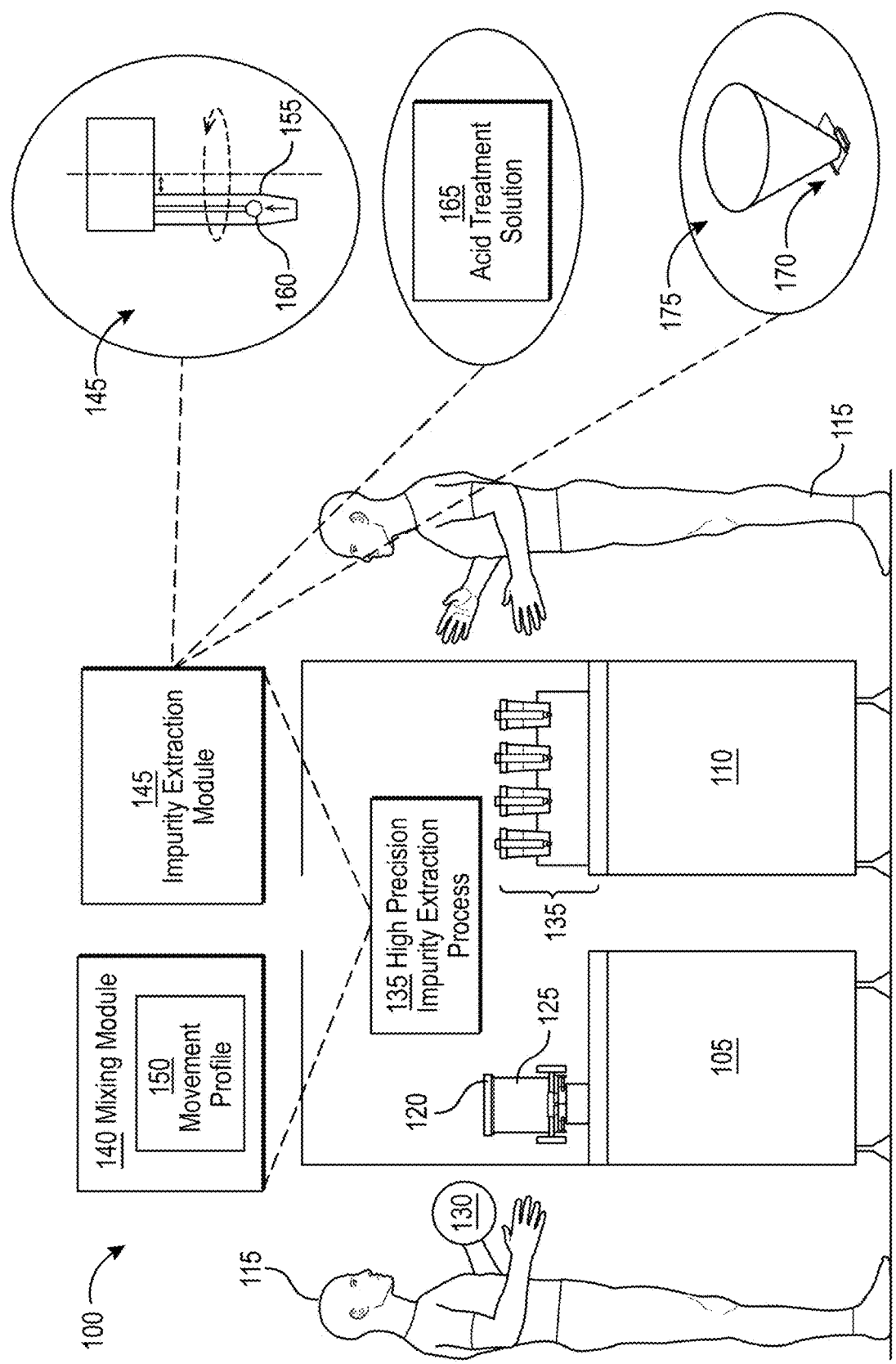
FIG. 1 depicts an exemplary rapid high precision impurity assessment system (RHPIAS) employed in an illustrative use-case scenario.

FIG. 1 depicts an exemplary rapid high precision impurity assessment system (RHPIAS 100) employed in an illustrative use-case scenario. In the depicted example, the RHPIAS 100 includes an input portal 105 and an output portal 110. As shown, the RHPIAS 100 is operated by a user 115. In some embodiments, a single user may operate the RHPIAS 100. In some embodiments, the RHPIAS 100 may receive input from a machine (e.g., a conveyor system, a robotic arm).

The input portal 105, for example, may receive a battery bulk material sample (BBMS 130) (e.g., a sample of bulk electrode materials) in a mix container 120. For example, the output portal 110 may allow the user 115 to load the mix container 120 with electrode samples retrieved from a bulk electrode material. In some implementations, the mix container 120 may be configured to hold a mixture 125 (e.g., a battery slurry) including the BBMS 130 and dispersants.

For example, the BBMS 130 may include anode active materials, cathode active materials, semiconductor materials, electronic materials, ceramic raw materials, metal powders, pharmaceutical raw material, and/or a combination thereof. For example, the BBMS 130 may include ferromagnetic impurities (e.g., iron, nickel, cobalt), paramagnetic impurities (e.g., aluminum, magnesium, titanium, manganese), weakly magnetic impurities (e.g., copper, platinum, gold, graphite), and/or non-magnetic impurities (e.g., silica, alumina, residual organic matter, plastic microparticles). In some examples, the RHPIAS 100 may be configured to measure a presence and/or concentration of a target impurity (e.g., one or more types of the ferromagnetic impurities).

For example, the BBMS 130 may be disposed (e.g., mixed) into a dispersant. In some implementations, the dispersant may be introduced by the RHPIAS 100 before and/or after the BBMS 130 is loaded into the mix container 120 by the user 115. For example, the dispersant may be selected based on chemical and/or physical properties (e.g., polarity, hydrophilicity, hydrophobicity, reactivity, impurity, volatility, wettability, rapid drying) of the target impurity. In some examples, the dispersant may include a viscosity to aid uniform dispersant of the target impurity based on surface tension. For example, the dispersant may be selected to facilitate subsequent separation/analysis processes. For example, the dispersant may include (e.g., high concentration) alcoholic liquids (e.g., ethanol, isopropanol, n-propanol). For example, the dispersant may include aqueous dispersants (e.g., deionized water, ultrapure water). For example, the dispersant may include organic solvents (e.g., N-methyl-2-pyrrolidone, dimethylformamide). For example, the dispersant may include mixed dispersants (e.g., ethanol/water mixtures, aqueous solutions with surfactant addition). In some implementations, a weight ratio of the BBMS 130 and the dispersant may be 1:1.5 to 1:20 (e.g., 1:2).

The output portal 110 may include rinse cups and conical tubes 135. The user may place rinse cups and conical tubes 135 into the RHPIAS 100 and retrieve the used rinse cups and conical tubes 135 containing the impurity samples for further impurity analysis (e.g., Inductively coupled plasma (ICP) analysis, Scanning Electron Microscopy (SEM) analysis, X-ray fluorescence (XRF) analysis).

The RHPIAS 100 includes a high precision impurity extraction process (HPIEP 185) to extract the target impurities from the mixture 125. The HPIEP 185 includes a mixing module 140 and an impurity extraction module (IEM 145).

For example, the mixing module 140 may agitate the BBMS 130 in the dispersant. As shown, the mixing module 140 includes a movement profile 150. For example, the movement profile 150 may include target movement profile to agitate the mix container 120 based on the target impurities. For example, the movement profile 150 may advantageously mix the mixture 125 uniformly mixed without precipitates. In some embodiments, the movement profile 150 may include one or more rotational pause points to advantageously remove gravitational bottom of the mixture 125 within the mix container 120.

In this example, after the mixture 125 is agitated by the mixing module 140, the mix container 120 may be processed by the IEM 145 (e.g., by an internal transportation system). As shown, the IEM 145 includes an impurity extraction rod (IER 155). For example, the IER 155 may capture magnetic and non-magnetic impurities from the mixture 125 in the mix container 120 when the IER 155 is inserted into the mix container 120.

As shown, the IER 155 includes a magnetic mass 160. For example, the magnetic mass 160 may include electromagnets, permanent magnets, and/or a combination thereof. In some implementations, the magnetic mass 160 may translate within the IER 155 along a curvilinear path. For example, a magnetic field at a surface of the IER 155 may vary based on a position of the magnetic mass 160. In some examples, the magnetic mass 160 may include a magnetized state in a first position (e.g., when the magnetic mass 160 moves downwards towards a distal end of the IER 155). In some examples, the magnetic mass 160 may include a demagnetized state in a second position (e.g., when the magnetic mass 160 moves upwards away from the distal end of the IER 155).

For example, in capture mode, the magnetic mass 160 may move in a first preset motion. For example, the IER 155 may capture magnetic substances within the mixture 125. For example, in a non-target substance rinsing mode, the IER 155 may be rinsed by a rinsing solution to release non-target substances while the magnetic mass 160 may move according to a second preset motion.

As shown, the IER 155 may be configured to be capable of performing a rotational motion (e.g., to stir the mixture 125 within the mix container 120 when inserted into the mix container 120). In some examples, the IER 155 may be configured to perform translational motion (e.g., up and down movement, left and right movement).

In some embodiments, the IER 155 may be operated in an ionization mode. For example, in the ionization mode, the IER 155 may be inserted into a container containing an acid treatment solution 165. For example, the magnetic mass 160 may operate in a third preset motion when the acid treatment solution 165 dissolves the target substance captured on the IER 155. In some implementations, the target substance dissolved in the acid treatment solution 165 may be introduced into a sample container (e.g., the conical tubes 135) to be retrieved by the user 115.

Room Temperature Quick Impurity Solvent

In some implementations, the acid treatment solution 165 may be preloaded into the rinse cups by the user 115. For example, the acid treatment solution 165 may include 1:1 weight ratio of hydrochloric acid (HCl) and nitric acid ($HNO_3$). For example, the acid treatment solution 165 may include a sulphuric acid. In some examples, the acid treatment solution 165 may dissolve the target substance from the IER 155 at room temperature within 15 minutes.

In some embodiments, the acid treatment solution 165 may be introduced to a base solution (preloaded) in the rinsing cups configured to raise a temperature of the acid treatment solution 165 by an acid-base reaction. For example, the basic solutions may include sodium hydroxide (NaOH), potassium hydroxide (KOH), calcium hydroxide ($Ca(OH)_2$), magnesium hydroxide ($Mg(OH)_2$), barium hydroxide ($Ba(OH)_2$), lithium hydroxide (LiOH), and aqueous solutions of ammonia ($NH_4OH$), aluminum hydroxide ($Al(OH)_3$), sodium carbonate ($Na_2CO_3$), trisodium phosphate ($Na_3PO_4$), and/or any combinations thereof.

In some implementations, the IER 155 may be operated, alternative to the ionization mode, in a sampling mode. For example, in the sampling mode, the target substance captured on the IER 155 may be captured on a filter paper 170 (e.g., a carbon paper) to be sampled. For example, in the sampling mode, the IER 155 (e.g., after being rinsed of non-target material) may be inserted into an alcoholic solution with the magnetic mass 160 in a fourth preset motion (e.g., in a demagnetizing state).

For example, the target substance captured on the IER 155 may be separated by vacuum filtration step 175. For example, the alcoholic solution containing the separated target substance may be vacuum filtered by a vacuum filter. For example, the filter paper 170 may be (rapidly) dried after the vacuum filtration step 175. For example, the filter paper 170 may capture the dried target substance to be retrieved by the user 115. For example, the user 115 may advantageously place the filter paper 170 directly into a SEM machine for spectral analysis.

Figure 2:
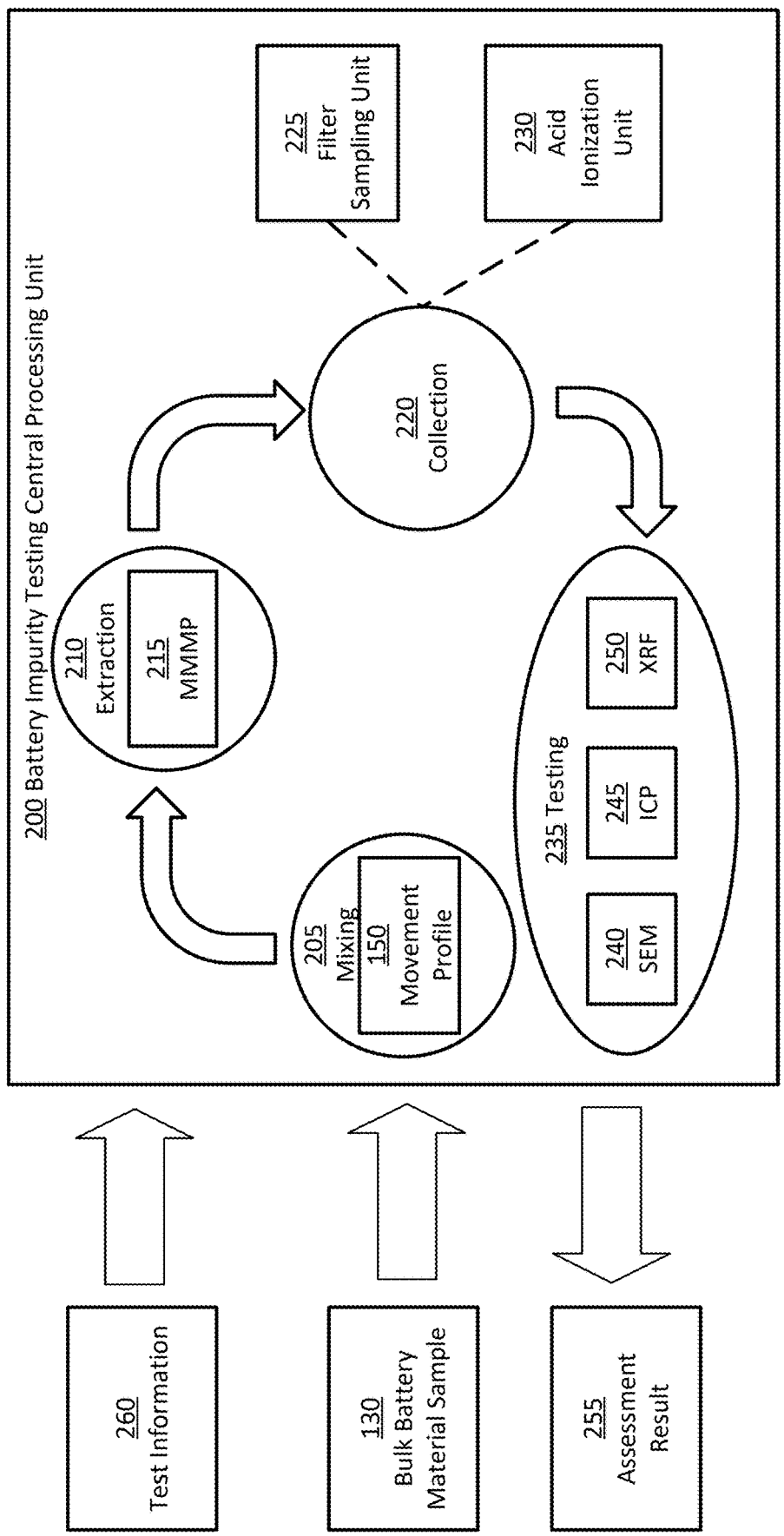
FIG. 2 is a block diagram depicting an exemplary battery impurity testing central processing unit (BITCPU).

FIG. 2 is a block diagram depicting an exemplary battery impurity testing central processing unit (BITCPU 200). As shown, the BITCPU 200 receives the BBMS 130 for quality assessment. In this example, the BITCPU 200 may process the BBMS 130 in a mixing process 205. For example, the mixing process 205 may include applying the mixture 125 having the BBMS 130 to be rotated according to the movement profile 150. For example, the mixing process 205 may include inserting the IER 155 into the mix container 120 to stir the mixture 125.

In an extraction process 210, the BITCPU 200 may operate the magnetic mass 160 according to a magnetic mass movement profile (MMMP 215) to capture magnetic impurities from the mixture 125 in the capture mode, remove the non-target substances in the non-target substance rinsing mode, and release the target substances in the sampling mode. Various movement profiles of the IER 155 and the magnetic mass 160 are described in further detail with respect to FIG. 8.

In a collection process 220, the BITCPU 200 may collect the target substance extracted from the BBMS 130 by a filter sampling unit 225 or an acid ionization unit 230. For example, the filter sampling unit 225 may include the filter paper 170 to collect the target substances. For example, the motor 415 may retrieve the target substances by dissolving the target substance in the acid treatment solution 165.

In a testing process 235, the BITCPU 200 may assess an impurity level of the BBMS 130 using a SEM machine 240, an ICP machine 245, or a XRF machine 250 in this example. For example, an assessment result 255 may be transmitted to an external device (e.g., a display, a computer device). For example, the assessment result 255 may include a billion per part (bbp) of one or more of the target substances within the BBMS 130. For example, the assessment result 255 may include a pass/fail indication related to the BBMS 130.

In this example, the BITCPU 200 also receives test information 260. For example, the test information 260 may be provided by a user. For example, the test information 260 may include a type of the BBMS 130. For example, the test information 260 may include a target substance to be extracted in a current process. For example, the test information 260 may include a dispersant used in the mix container 120. In some implementations, the BITCPU 200 may configure the movement profile 150 and the MMMP 215 based on the test information 260.

In some implementations, the type of the BBMS 130 may include cathodes active materials (e.g., Mixed Metal Cathodes (MMC), Lithium Manganese Phosphate (LMP), Lithium Manganese Oxide (LMO), Lithium Nickel Cobalt Aluminum Oxide (NCA)). For example, the test information 260 may include a nickel content (e.g., high, low, approximate concentration) in the BBMS 130. For example, the test information 260 may include magnetic properties of the BBMS 130. For example, the test information 260 may indicate a precursor material in the BBMS 130. For example, the precursor material may be super paramagnetic. For example, the test information 260 may indicate that the BBMS 130 may be anode active materials (e.g., graphite, graphene).

Figure 3:
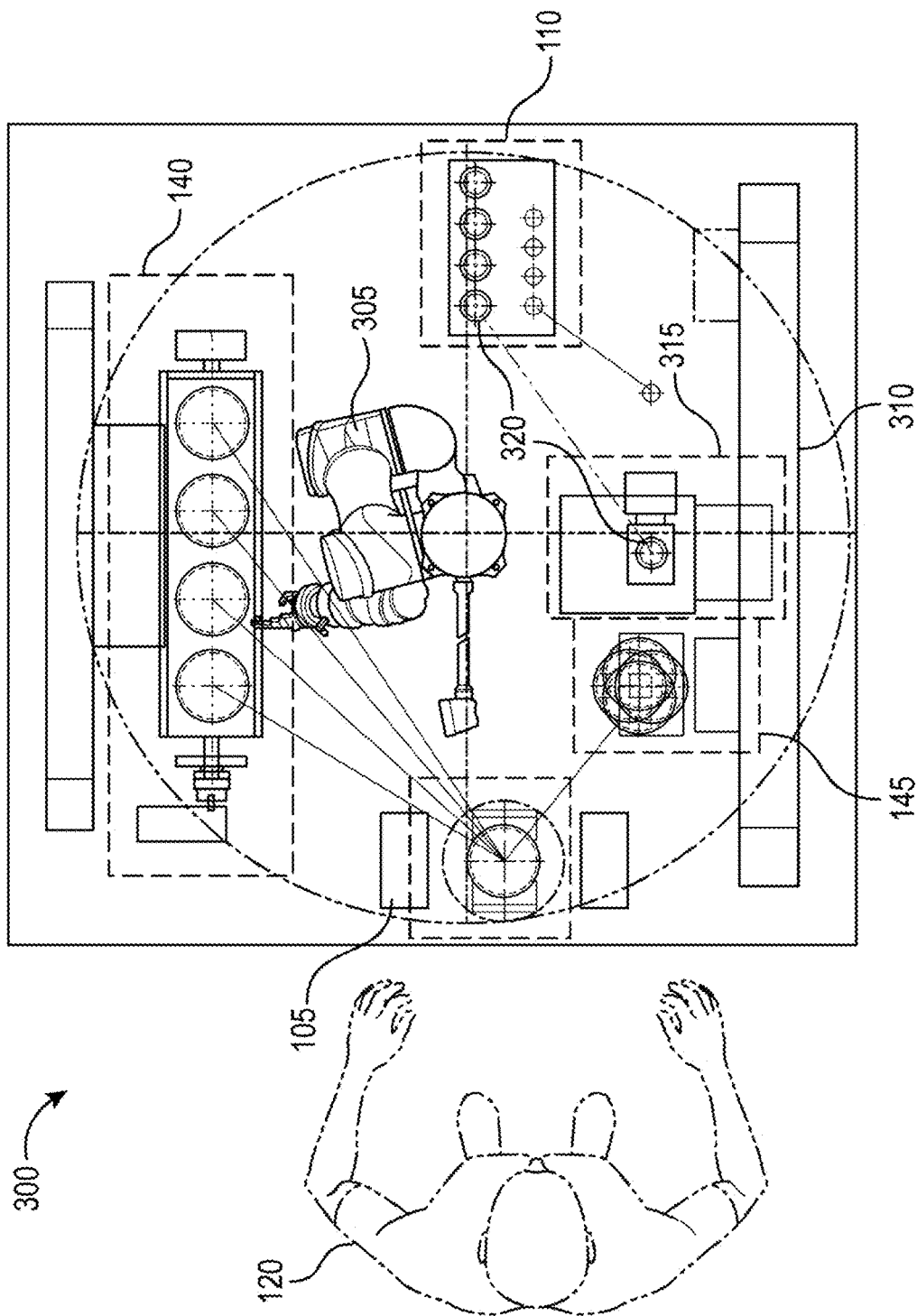
FIG. 3 depicts an exemplary schematic of a RHPIAS.

FIG. 3 depicts an exemplary schematic of a RHPIAS. In the depicted example, a RHPIAS 300 includes the input portal 105. For example, the user 115 may load the BBMS 130 into mix container 120 via the input portal 105. In some implementations, the mix container 120 may be made of polypropylene. For example, the mix container 120 may also be made with borosilicate glass, stainless steel, and/or Teflon. For example, an inner surface of the mix container 120 may be super-smooth to advantageously minimize adhesion of the BBMS 130 to the inner surface.

In some implementations, the mix container 120 may be cylindrical. For example, the mix container 120 may include an upper portion formed with an openable opening for introducing the BBMS 130 and the dispersant. For example, the mix container 120 may include a lower bottom portion having a rounded shape to allow for uniform mixing.

In some implementations, the input portal 105 may be configured to add dispersant (e.g., ultrapure water, deionized water) into the mix container 120 automatically based on a weight of the BBMS 130. For example, the RHPIAS 300 may add 500 ml of water into 300 g of the BBMS 130. For example, the amount of dispersant may be nonlinear with the weight of the BBMS 130. For example, the RHPIAS 300 may add 300 ml of water into 150 g of the BBMS 130. For example, the RHPIAS 300 may add 750 ml of water into 500 g of the BBMS 130.

In this example, the RHPIAS 300 includes a robotic arm 305. For example, the robotic arm 305 may be controlled by a control module (not shown) of the RHPIAS 300. The robotic arm 305, for example, may transport the mix container 120 from the input portal 105 to the mixing module 140. Various embodiments may advantageously prevent settling of the BBMS 130 at a bottom of the mix container 120.

After the mixing module 140 agitated the mix container 120, the robotic arm 305 may move the mix container 120 to the IEM 145. The IEM 145 may then be transported by a conveyor system 310 to an ionization module 315 after the non-target substances are removed from the IER 155. For example, the ionization module 315 may include a container 320 including the acid treatment solution 165. After the target substances are dissolved (e.g., after a predetermined duration) into the acid treatment solution 165, the robotic arm 305 may move the container 320 to the output portal 110. For example, user 115 may retrieve the container 320 from the output portal 110 for further analysis.

Figure 4A:
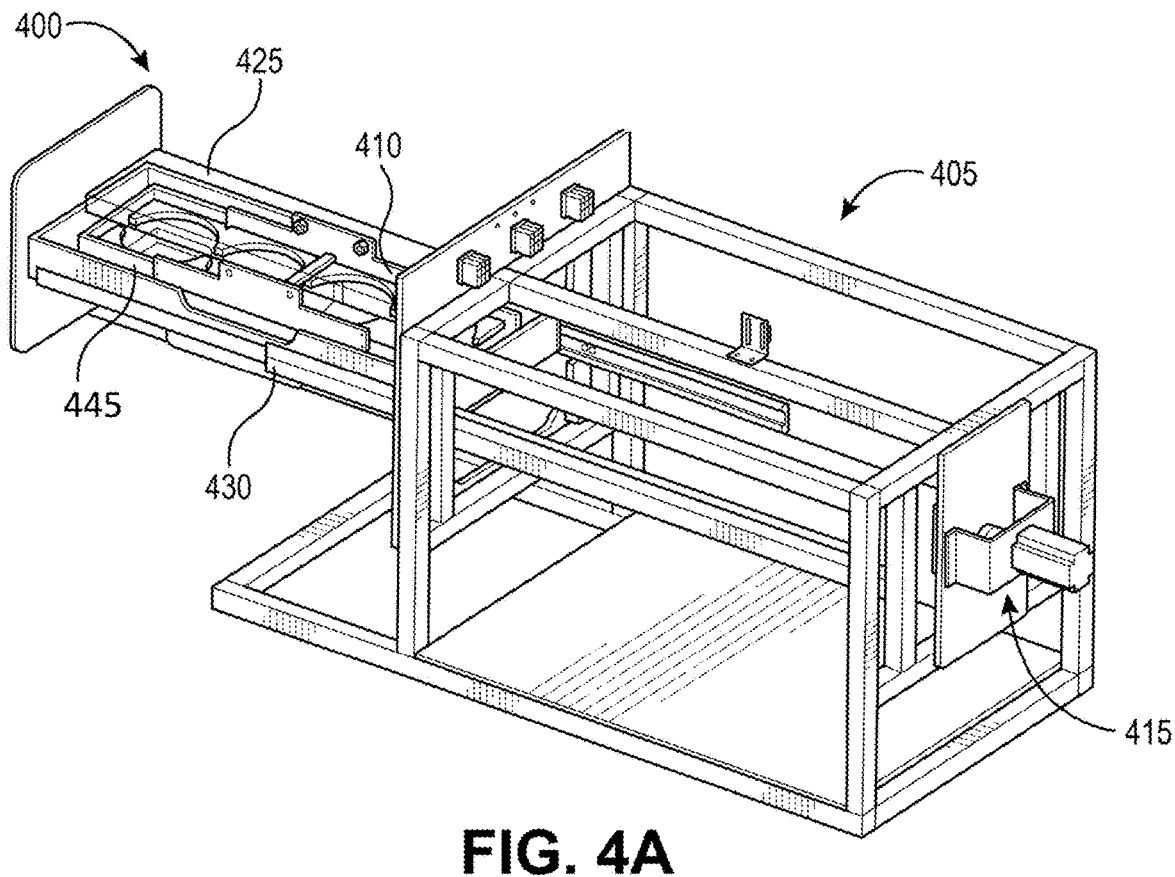
FIG. 4A, FIG. 4B, FIG. 4C, FIG. 4D, and FIG. 4E depict exemplary material agitation mixing unit (MAMU).

FIG. 4A, FIG. 4B, FIG. 4C, FIG. 4D, and FIG. 4E depict an exemplary material agitation mixing unit (MAMU). As shown in FIG. 4A, an agitation device 400 includes a rotating module 405. The rotating module 405 is coupled to a mixing vessel 410 (e.g., the mix container 120 as described in FIGS. 1-3). The agitation device 400, in this example, includes a motor 415. For example, the rotating module 405 may control the motor 415 to agitate (e.g., rotate, translate) the mixing vessel 410.

As shown, the agitation device 400 includes an interior space 420 to (e.g., slidingly) receive a tray 425 configured to hold the mixing vessel 410. For example, the tray 425 may slide into the interior space 420 via the guiding rail 430. For example, the guiding rail 430 may be configured to move the tray 425 in a horizontal direction. In some implementations, the interior space 420 may include sufficient internal space to allow the tray 425 to rotate and/or translate and/or vibrate.

Figure 4B:
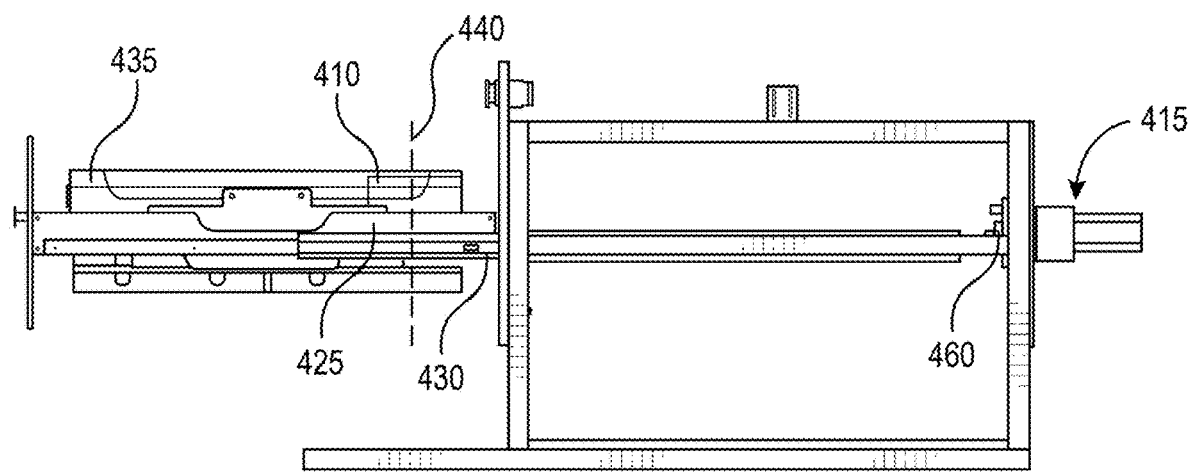

As shown in FIG. 4B, the tray 425 includes a container holder 435 configured to mount the mix container 120. In this example, the mixing vessel 410 is mounted in the tray 425 configured to rotate a vertical axis 440.

As an illustrative example, the container holder 435 may be coupled to a top surface of the tray 425 to securely hold the mixing vessel 410. In some implementations, the container holder 435 may include an adjustable clamp to advantageously accommodate various sizes of the mixing vessel 410.

Figure 4C:
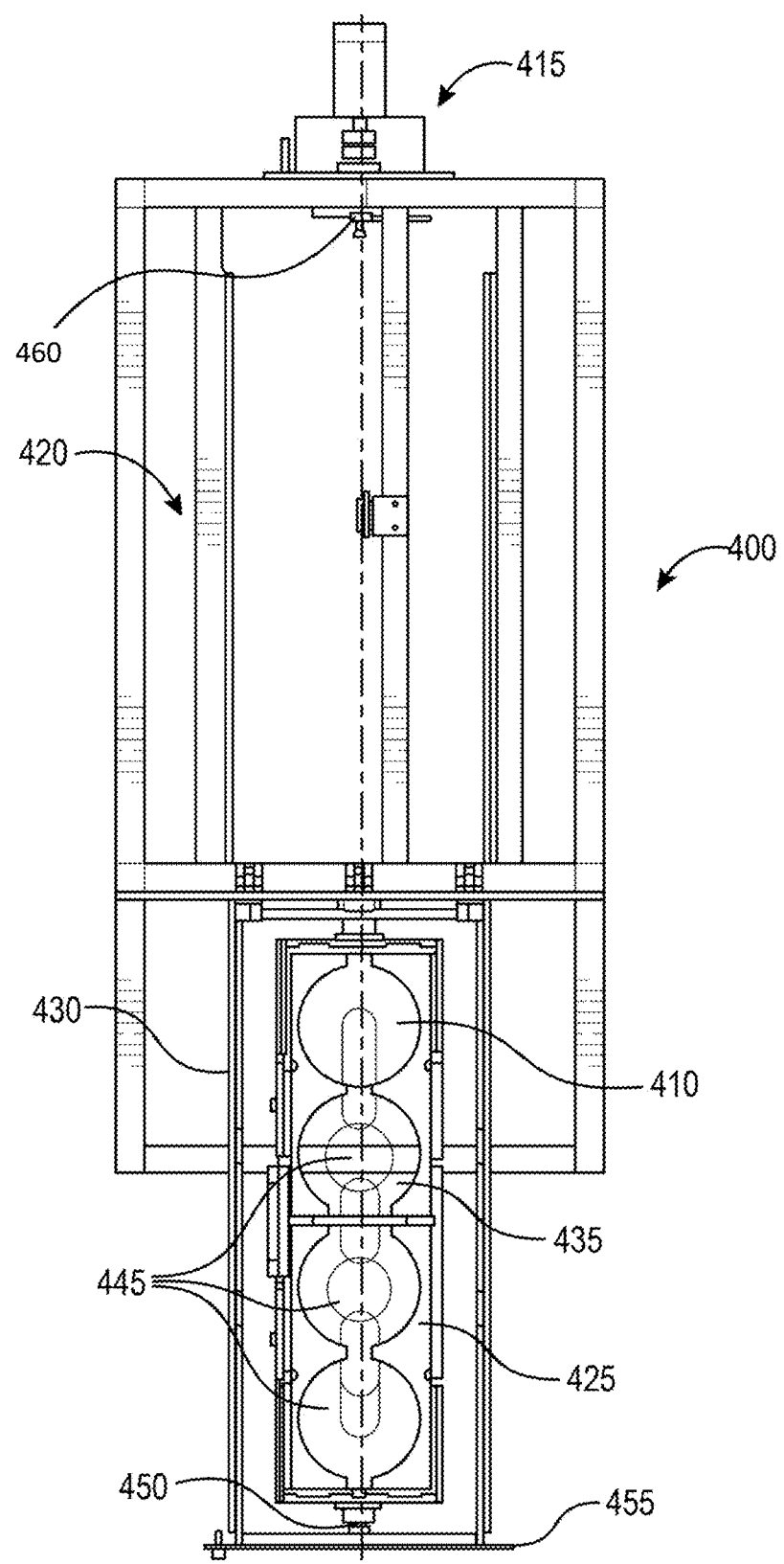

As shown in FIG. 4C, the container holder 435 includes multiple (e.g., 2, 3, 4, 5, more than 5) container compartments 445 to each accommodate a mixing vessel 410 simultaneously. In this example, the tray 425 extends along a longitudinal axis 450. The longitudinal axis 450 extends from the motor 415 at a proximal end of the tray 425 towards a distal end of the tray 425. In some implementations, when tray 425 is coupled to the motor 415 after it slides into the interior space 420, the tray 425 is configured to rotate with respect to the longitudinal axis 450 (e.g., counterclockwise, clockwise).

As shown in FIG. 4C, the tray 425 includes a cover 455. When the tray 425 is inserted into the interior space 420, for example, the cover 455 may seal an opening of the agitation device 400. For example, the cover 455 may include sensors. For example, the cover 455 may include position sensors to detect whether the tray 425 is displaced from the interior space 420. For example, when the tray 425 is displaced more than a predetermined threshold, the motor 415 may stop a rotation of the tray 425. In some implementations, the tray 425 may include a locking unit to prevent tray 425 from being withdrawn when the tray 425 is retracted into the interior space 420. In some examples, the tray 425 may be manually inserted into the interior space 420. In some examples, the tray 425 may be automatically moved by a control module.

In some implementations, the motor 415 is coupled to a coupling 460 configured to connect the motor 415 to the tray 425 as shown in FIG. 4B. In some embodiments, the motor 415 may be connected to a sensor (e.g., a hall sensor, a position sensor) configured to detect a rotation state of the motor 415 and/or a connection state between the coupling 460 and the motor 415. For example, the motor 415 may be capable of forward and reverse rotation. For example, the motor 415 may advantageously effectively mix the mixture 125 in the mixing vessel 410. For example, the motor 415 may include a stepper motor. For example, the motor 415 may include a servo motor. For example, the motor 415 may include an alternating current motor. For example, the motor 415 may include a direct current motor. For example, the motor 415 may include a pneumatic motor, and a hydraulic motor. In some embodiments, the motor 415 may be configured to control a precious step of rotation displacement of the mixing vessel 410 (e.g., 1.8 degrees, 0.9 degrees, smaller than 0.9 degrees) smaller angles. For example, the motor 415 may rotate the tray 425 based on the movement profile 150 to pause movement and restart movement at a predetermined angular displacement. For example, the agitation device 400 may advantageously remove a gravitational bottom of the mixture 125 based on the movement profile 150.

Figure 4D:
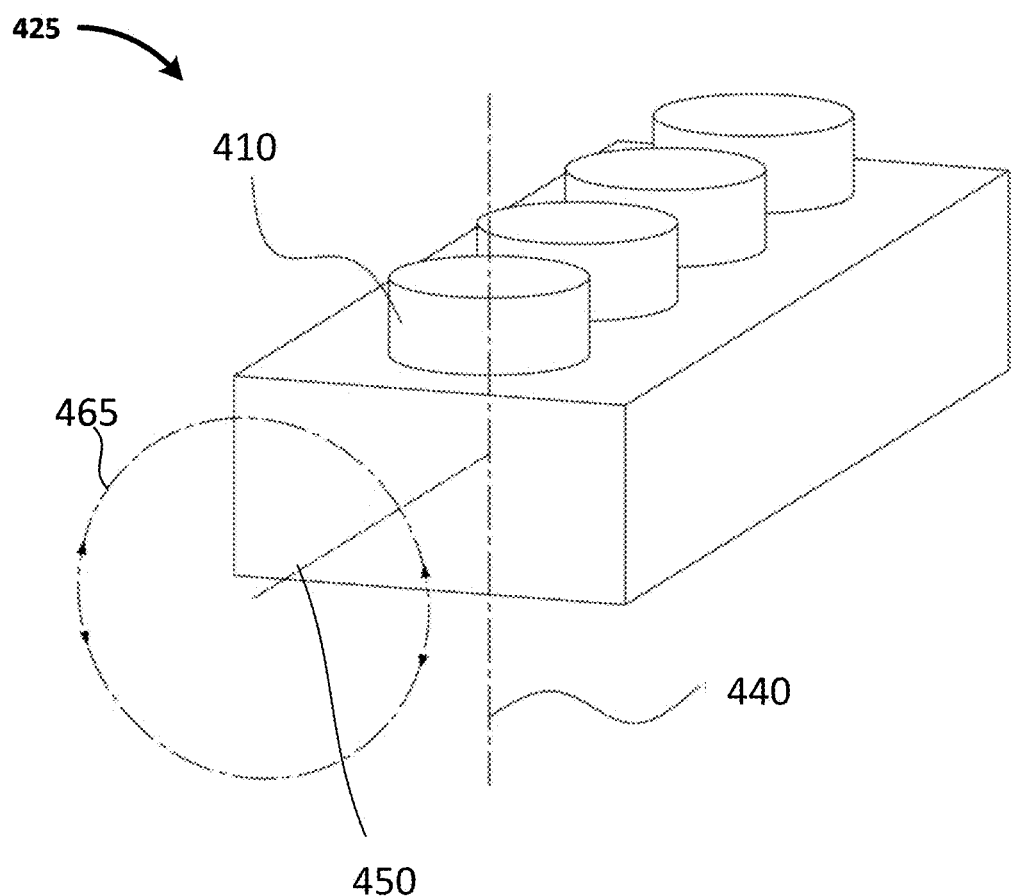

As shown in FIG. 4D, a close-up diagram showing the tray 425 holding the mixing vessel 410 is shown. In this example, the mixing vessel 410 may be rotated according to a rotational motion 465 (e.g., based on the movement profile 150) in either direction about the longitudinal axis 450.

In some implementations, the tray 425 may be rotated. For example, the vertical axis 440 may be rotated to stir the mixture 125 within the mixing vessel 410. In some implementations, in the mixing process 205, the tray 425 may be stirred in more than one movement profile 150 to ensure the mixture 125 is sufficiently stirred. For example, the movement profile 150 may be selected based on the BBMS 130. For example, the movement profile 150 may include a rotation of the mixing vessel 410 by 180 degrees and a rotation stop time of 0.1 to 1 second at this degree before the rotational motion 465 is resumed.

Figure 4E:
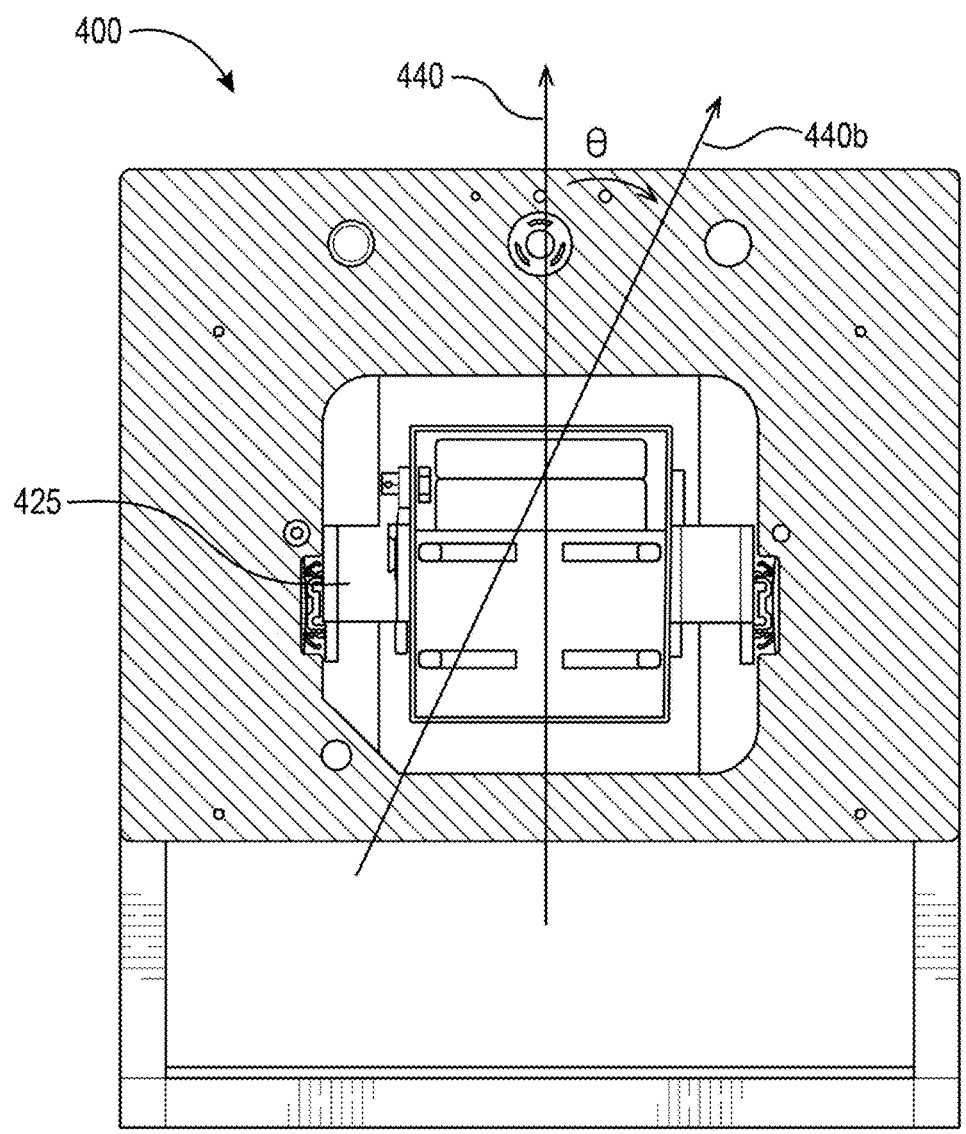

FIG. 4E shows a cross-sectional view of the agitation device 400. The agitation device 400 includes the vertical axis 440 at an initial position vertical relative to a ground 470 (e.g., perpendicular to gravitational gradients). As an illustrative example without limitation, the agitation device 400 as shown in FIG. 4E may be rotating clockwise. For example, at a time after a rotation start, the motor 415 may rotate the vertical axis 440 of the tray 425 from an initial position 440a to a second angular position 440b. For example, the agitation device 400 may include an angular position sensor to detect an angular displacement θ from the initial (0°) position.

In some implementations, the longitudinal axis 450 may control the motor 415 to temporarily pause when the second angular position 440b is 180° from the initial position 440a. For example, the mix container 120 may hold upside down for a predetermined duration (e.g., 0.1 second, 1 second, 2 seconds, 5 seconds, 10 seconds, 1 minute) before the rotation resumes. For example, the predetermined duration may be determined based on a type of the BBMS 130 and/or the dispersant contained in the mix container 120. Various embodiments may advantageously eliminate a gravitational bottom of the mix container 120. For example, some embodiments may advantageously generate a homogenization of the mixture 125 without causing agglomeration.

In various implementations, a battery material mixing device (e.g., the agitation device 400) may include an actuator (e.g., the motor 415) coupled (e.g., via the coupling 460) to a vessel holder (e.g., the tray 425) configured to hold vertically a container (e.g., the mixing vessel 410) of battery materials, dispersants, and impurities (e.g., the mixture 125). For example, a vertical axis (e.g., the vertical axis 440) of the container is orthogonal to a gravitational gradient of the container at an initial point of 0 degree angular displacement. For example, the actuator may be configured to rotate the vertical axis of the vessel holder about a horizontal axis (e.g., the longitudinal axis 450) according to a movement profile (e.g., the movement profile 150) that includes temporarily stopping the movement of the vessel holder when the vertical axis is rotated 180 degrees.

Figure 5:
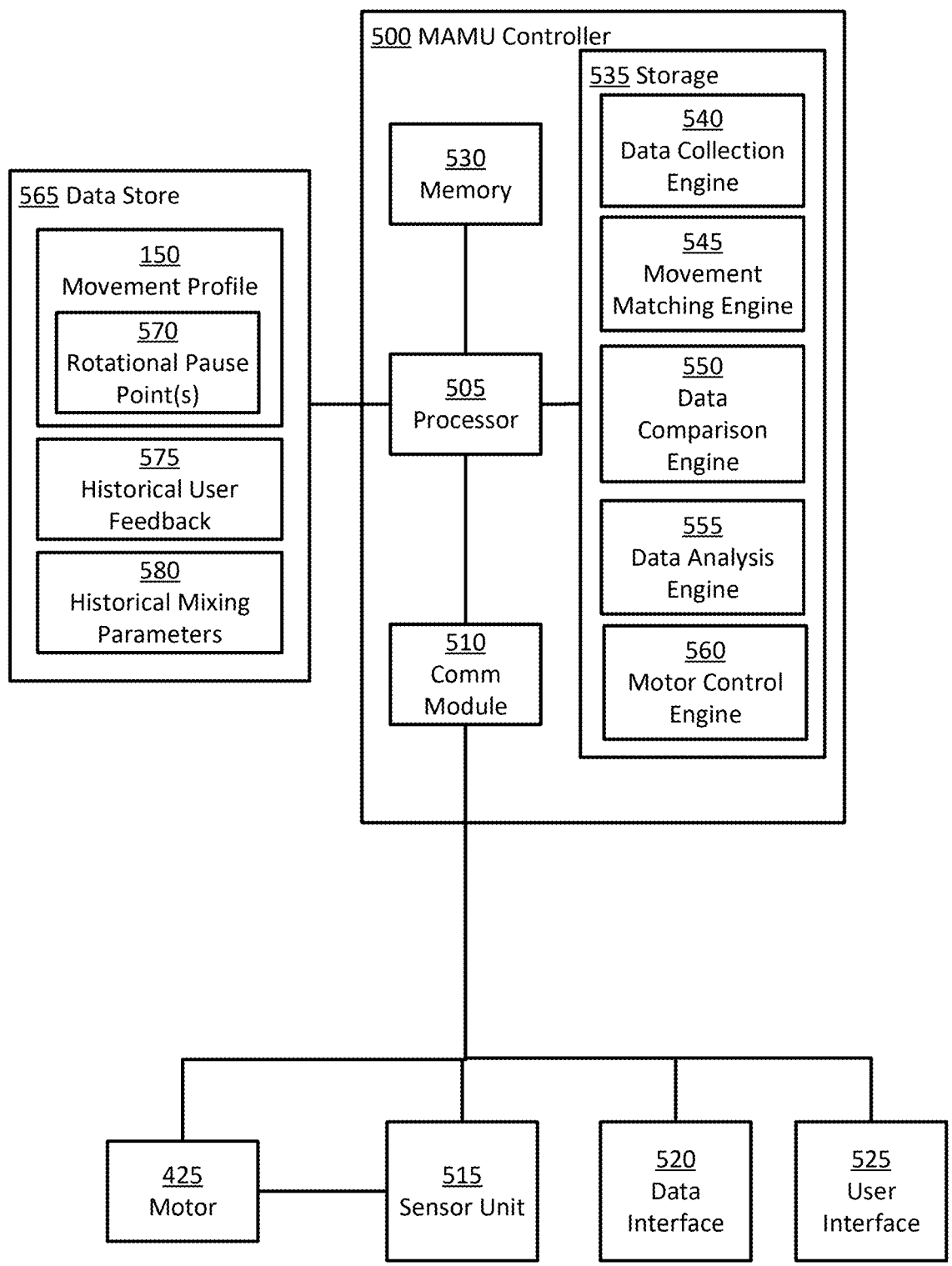
FIG. 5 is a block diagram depicting an exemplary MAMU controller.

FIG. 5 is a block diagram depicting an exemplary MAMU controller 500. The MAMU controller 500 includes a processor 505. The processor 505 may, for example, include one or more processing units. The processor 505 is operably coupled to a communication module 510. The communication module 510 may, for example, include wired communication. The communication module 510 may, for example, include wireless communication. In the depicted example, the communication module 510 is operably coupled to the motor 415, a sensor unit 515, a data input device 520, and a user interface 525.

In this example, the sensor unit 515 is connected to the motor 415. Further, the sensor unit 515 may measure rotation information including rotation speed, rotation direction, rotation time, and/or rotation angle of the motor 415. For example, the sensor unit 515 may include a detection sensor unit (e.g., an encoder, a potentiometer, a gyroscope, a Hall sensor, an optical sensor, a proximity sensor, a timer) to determine the angular position of the vertical axis 440.

In some implementations, the sensor unit 515 may include a sensor configured to measure environmental information (e.g., temperature, humidity, air pressure, weight of the mixing vessel 410). For example, the sensor unit 515 may include temperature sensor, a humidity sensor, an air pressure sensor, a scale sensor, or other sensors configured to measure environmental parameters of a testing room having the agitation device 400.

In some implementations, the sensor unit 515 may include sensors to detect a good connection at the coupling 460. For example, upon receiving a signal indicating a lid of the tray 425 is separated from the interior space 420, the exemplary MAMU controller 500 may stop an operation of the motor 415 urgently to prevent spilling.

For example, the data input device 520 may include a radio frequency identification (RFID) reader. For example, the data input device 520 may include a barcode scanner. For example, the data input device 520 may be configured to retrieve information from a tag (e.g., a RFID tag, a barcode, a quick response (QR) code) from an exterior of the mixing vessel 410 to identify information about the mixture 125 introduced into the mixing vessel 410. For example, the data input device 520 may be configured to transmit and/or receive signals from a central controller (e.g., the BITCPU 200) In some implementations, the BITCPU 200 may coordinate a testing process of the BBMS 130 based on status at the BITCPU 200. The user interface 525 may be configured to receive user input, for example, and/or display output to the user 115.

In some implementations, the tag may be adhered to a rack of output solution (e.g., the conical tubes 135). For example, based on information retrieved from the tag, the BITCPU 200 may be configured to transfer the rack a preselected ICP machines (e.g., by the robotic arm 305). For example, the robotic arm 305 may be configured to transfer the rack to a predetermined place (e.g., specific compartment of an analysis machine, a designated storage area for, for example, certain type of impurity analysis). In some implementations, the user interface 525 may display test information based on the tag. In some implementations, the rack may include wells configured to hole conical tubes of output solution. For example, the tag may be disposed near each of the wells.

The processor 505 is operably coupled to a memory module 530. The memory module 530 may, for example, include one or more memory modules (e.g., random-access memory (RAM)). The processor 505 includes a storage module 535. The storage module 535 may, for example, include one or more storage modules (e.g., non-volatile memory). In the depicted example, the storage module 535 includes a data collection engine (DCE 540), a movement matching engine (MME 545), a data comparison engine (DCE 550), a data analysis engine (DAE 555), and a motor control engine (MCE 560).

For example, the DCE 540 may collect mixing information including a type, a concentration, viscosity and other characteristics of the mixture 125, the dispersant, and/or the mixture 125. For example, the information may be received from the data input device 520 (e.g., RFID or barcode scanning information of the mix container 120 from the sensor unit 515). In some examples, the information may be received from user input received from the user interface 525.

The processor 505 is further operably coupled to a data store 565. The data store 565 includes the movement profile 150. In the depicted example, the movement profile 150 includes a rotational pause point(s) (RPPs 570). For example, the MME 545 may match one of the movement profile 150 to the mixing information. In some implementations, the movement profile 150 may include rotational movement instructions, translational movement instructions, and/or vibrational movement instructions. In some implementations, the data store 565 may agitate the mixing vessel 410 based on the movement profile 150. In some implementations, the MCE 560 may pause a rotation of the tray 425 based on the location of the RPPs 570. For example, the RPPs 570 may indicate one or more angular positions for a rotational movement to be temporarily paused.

For example, the DCE 550 may receive user feedback (e.g., from the user interface 525, from the data input device 520). For example, the user feedback may include an evaluation of the dispersant state of the mixture 125 after a mixing process is completed. For example, the mixing process may be completed when a full cycle indicated by the selected movement profile 150 is completed. In some implementations, the DCE 550 may update the user feedback in real time to a historical user feedback 575 in the data store 565.

In some examples, the mixture 125 may include a more viscous slurry (e.g., due to a larger amount of the BBMS 130 loaded at the input portal 105). For example, the movement profile 150 may include a longer pausing time at the RPPs 570. For example, the duration of agitation may be extended based on the movement profile 150 when a viscosity of the mixture 125 is high.

For example, the DAE 555 may record mixing parameters to be stored in a historical mixing parameters database 580. For example, the mixing parameters may include a rotation speed, the RPPs 570 used, and a rotation time of a mixing process. In some implementations, based on the user feedback collected by the DCE 550, the historical mixing parameters database 580 may be analyzed to generate an updated movement profile 150.

In some implementations, the DAE 555 may update the movement profile 150 in real-time based on measurements from the sensor unit 515. Accordingly, the exemplary MAMU controller 500 may advantageously select the movement profile 150 based on characteristics of the mixture 125 to adaptively enhance efficiency and accuracy of mixing in real-time.

For example, the MCE 560 may be configured to control the motor 415 in real time to adjust the motor 415 to switch between more than one movement profile 150 during the mixing process. For example, the movement profile 150 may include a rotation speed, a rotation direction, a rotation duration, and the RPPs 570 and corresponding rotation stop time according to a current rotation angle (e.g., the second angular position 440b).

In some implementations, the data store 565 may include multiple rotation/movement profiles. For example, based on the BBMS 130 and/or the dispersant used, the MME 545 may select the movement profile 150 to create homogenization of the mixture 125. Various embodiments may advantageously break large particles (such as secondary or tertiary particles) in the mixture 125 into small particles (primary particles). In some examples, the small impurities that may be stuck or agglomerated between the large particle impurities may be effectively released. Various embodiments may advantageously facilitate very small particles at the nanometer and ppm level to advantageously be separated in subsequent processing.

Figure 6:
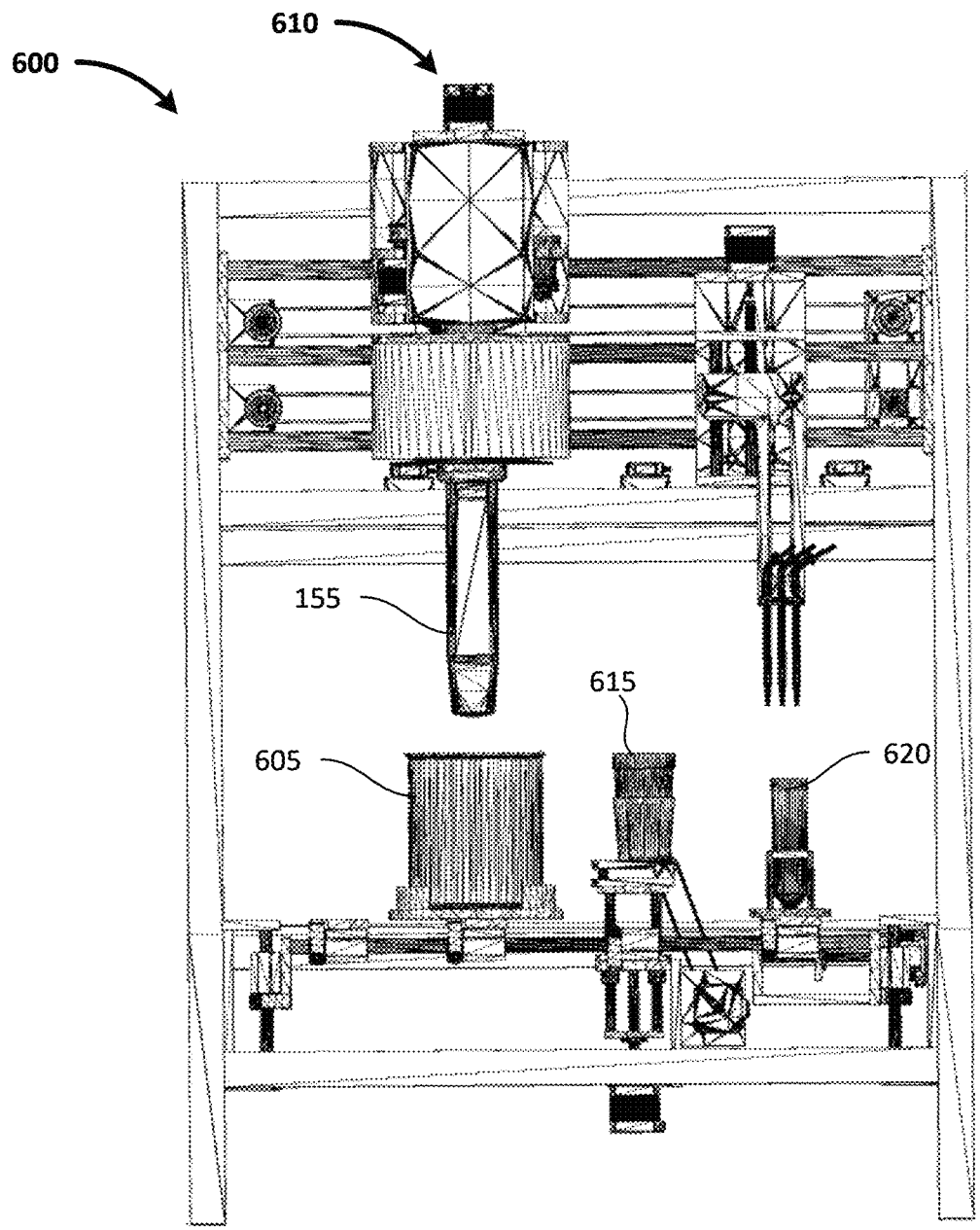
FIG. 6 depicts an exemplary target impurity collection unit (TICU).

FIG. 6 depicts an exemplary target impurity collection unit (TICU). In the depicted example, the TICU 600 includes a mix container 605 (e.g., the mix container 120). For example, the mix container 605 may hold a powder material (e.g., the BBMS 130) and water to mix them into a slurry.

As shown, the TICU 600 includes the IER 155. For example, the IER 155 may be suspended on a conveyor system 610. In some implementations, the IER 155 may be operated to be inserted into the mix container 605 to perform an initial collection (e.g., a first part of the extraction process 210) of impurities (e.g., including paramagnetic and ferromagnetic particles from the slurry.

The TICU 600 includes a rinse container 615. For example, the TICU 600 may perform a second part of the extraction process 210 in the rinse container 615 to rinse off the non-targeted substances. In some implementations, as a pretreatment process, the rinse container 615 may clean the IER 155 to remove excess cathode powder and/or the non-target substances to isolate the target substances (e.g., impurities of interest) to be retained with the IER 155 in a rinsing process.

Multiple rinses may be performed during the rinse process, for example. In some implementations, excess solution/mixture with cathode powder (e.g., and/or non-target substances) may be dumped out after each rinse. After the rinse process is complete, the rinse container 615 may hold the acid treatment solution 165 for ionizing the remaining target impurity particles (e.g., as the acid ionization unit 230).

The TICU 600, as shown, includes a conical tube 620. For example, the conical tube 620 may include a 50 mL conical tube configured to receive a final sample after the ionization process. For example, the conical tube 620 may receive the acid treatment solution 165 with the ionized particles from the rinse container 615. In some implementations, the acid treatment solution 165 may be diluted to 50 mL (e.g., or other suitable volume based on quantity and/or pH value requirement) in the conical tube 620.

Figure 7A:
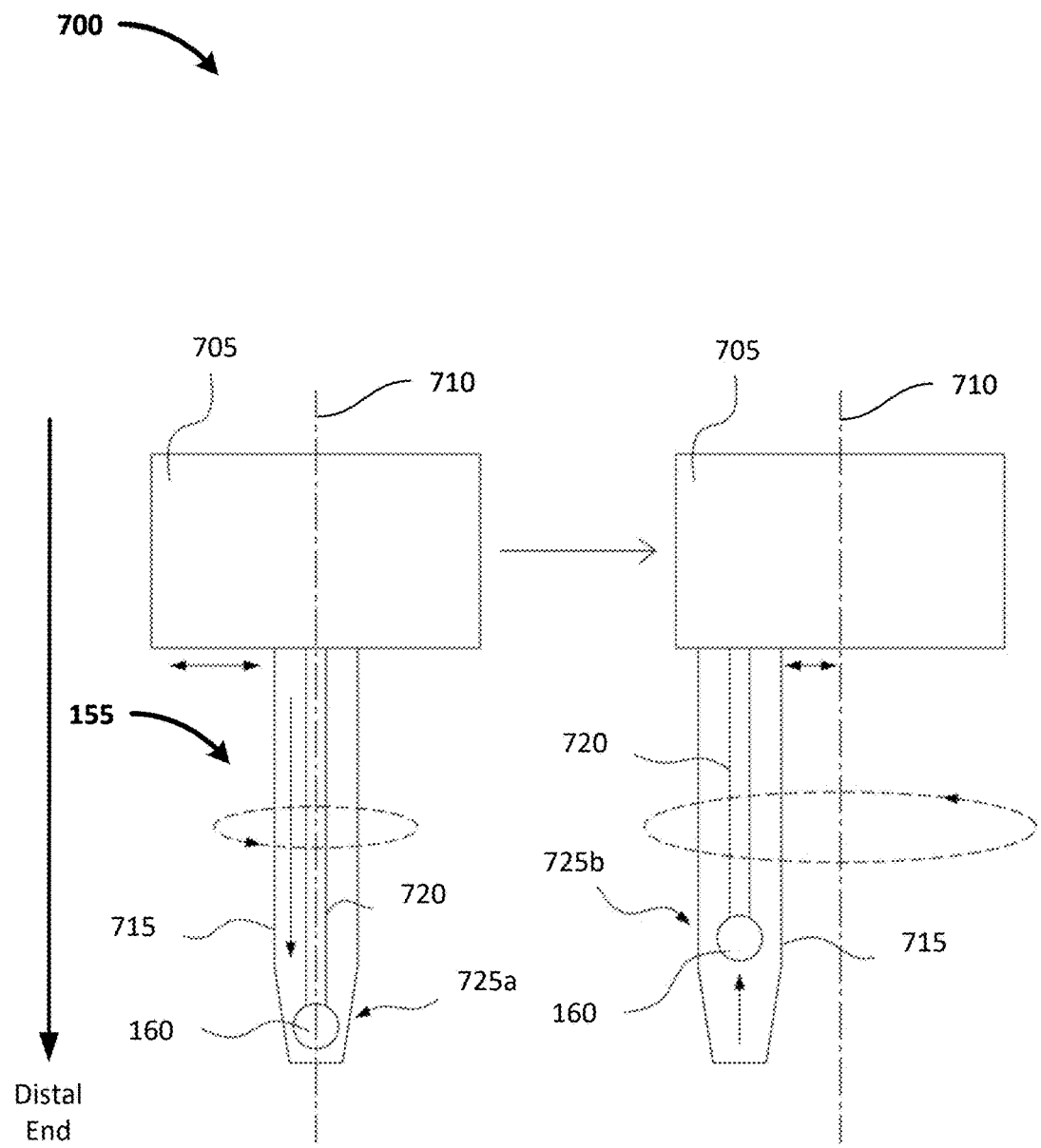
FIG. 7A depicts an exemplary impurity extraction device (IED).

FIG. 7A depicts an exemplary impurity extraction device (IED). In this example, an IED 700 includes the IER 155 connected to a movement module 705. For example, the movement module 705 may be configured to move the IER 155 translationally from a center of the IED 700 to a periphery of the IED 700. In some examples, the movement module 705 may be configured to rotate the IER 155 about a center axis 710 of the IED 700. In some examples, the movement module 705 may be configured to lift the IER 155 vertically parallel to the center axis 710 (e.g., in an up and down motion). In some examples, the movement module 705 may move the IER 155 circularly around the center axis 710 in various diameters. Accordingly, for example, the movement module 705 may advantageously allow the IER 155 to, upon insertion into a container (e.g., the mixing vessel 410), sweep through content inside the container. For example, the IER 155 may advantageously capture magnetic material in the container effectively.

In the depicted example, the IER 155 includes a rod-shaped sheath 715. For example, the rod-shaped sheath 715 may be magnetically permeable. For example, the rod-shaped sheath 715 may include chemically stable material (e.g., polypropylene, Teflon®). Teflon is a registered trademark of the Chemours Company FC, LLC headquartered in Delaware, USA. In some examples, the rod-shaped sheath 715 may include plastic (e.g., acrylonitrile butadiene styrene (ABS)).

The rod-shaped sheath 715 enclosed the magnetic mass 160 and a position control bar 720. For example, the position control bar 720 may be configured to adjust a position of the magnetic mass 160 in the rod-shaped sheath 715.

In some implementations, the IER 155 may advantageously remove a need for a separate process of removing any magnetic material directly captured on the magnetic mass 160. In some examples, the magnetic mass 160 may be free from magnet damage issues when the directly captured magnetic material is being removed from the magnetic mass 160.

In the depicted example, the position control bar 720 may move the magnetic mass 160 from a first position 725a to a second position 725b. For example, at the first position 725a, the IER 155 may be magnetized at an exterior surface of the rod-shaped sheath 715 (e.g., magnetism is above a first predetermined threshold to attract magnetic impurities). At the second position 725b, the IER 155 may be demagnetized at the exterior surface of the rod-shaped sheath 715.

As shown, the rod-shaped sheath 715 may include a variable thickness. For example, the rod-shaped sheath 715 may include a thinner wall (e.g., 0.8 mm, 1 mm, less than 1.2 mm) at a distal end of the IER 155.

In some implementations, the first position 725a may be preset near the distal end of the IER 155. For example, the second position 725b may be preset at a position to be above a fill level of the mixture 125 in a rinsing container (e.g., the rinse container 615). Accordingly, for example, no magnetic field was generated in the mixture 125 when the magnetic mass 160 is positioned at the second position 725b. In some implementations, the second position 725b may be configured to be at a proximal end of the IER 155. For example, the second position 725b may be configured to be above predetermined fill level in the rinsing container 615.

In some implementations, the movement module 705 may control a facing of the magnetic mass 160 in the mixture 125. For example, by rotating the IER 155, a selected face of the magnetic mass 160 may be controlled to face a particular direction (e.g., externally outward from the center axis 710, internally towards the center axis 710). For example, the movement module 705 may control a face direction of a north/south pole of the magnetic mass 160.

By adjusting a magnetic strength at the exterior surface, a target magnetic impurity may be captured depending on a magnetic strength required to capture the target magnetic impurity. Various embodiments may advantageously improve an accuracy for capturing the target magnetic impurity.

As an illustrative example without limitation, the IER 155 may first be operated in the first position 725a to capture magnetic material in the mixture 125 in a first preset motion. For example, the magnetic materials may be captured on the exterior surface of the rod-shaped sheath 715 by the magnetic strength of the magnetic mass 160. With the magnetic mass 160 in the first position 725a, the movement module 705 may, in some implementations, move the IER 155 through the entire space inside the container at a first speed for a first duration. For example, the movement module 705 may continue stirring until it stops at the center of the container for a second time. As an illustrative example without limitation, the first preset motion may be a motion including moving the IER 155 at a speed of 1 m/min for 2.5 min and stops in the center of the container for 20 sec. In some embodiments, the speed, and the stopping duration may vary depending on the type (e.g., material composition, quality grading) of the BBMS 130. In some implementations, the IER 155 may include tapping around a bottom of the mix container 120 at the beginning of the first preset motion.

In the collection process 220 after the IER 155 captures the magnetic impurities, the IER 155 may be rinsed, for example, in a container containing a rinsing liquid to remove non-target substances. For example, in the collection process 220, the IER 155 having magnetic substances captured may be inserted into a container containing the rinsing liquid.

For example, the rinsing liquid may include an alcoholic liquor (e.g., ethanol, isopropanol, n-propanol). For example, the rinsing liquid may include an aqueous dispersion (e.g., deionized water, ultrapure water). For example, the rinsing liquid may include an organic solvent (e.g., N-methyl-2-pyrrolidone, dimethylformamide). For example, the rinsing liquid may include an ethanol/water mixture, an aqueous solution with surfactant, or a combination thereof. In some embodiments, the rinsing liquid may be selected to rinse the IER 155 to be uniformly dispersed. Various embodiments may advantageously reduce capillary action on the rod-shaped sheath 715. In some implementations, an ethanol based rinsing liquid may advantageously allow rapid drying, removing additional contaminants, and reducing static electricity to prevent fine particles from clumping together or sticking to the equipment, Various embodiments may advantageously efficiency and accuracy of target impurity capture.

In some implementations, in the collection process 220, the IER 155 may be operated in a second preset motion to rinse the non-target substances captured from the rod-shaped sheath 715. For example, the second preset motion may include a release step to position the magnetic mass 160 in the second position 725b and simultaneously shake the IER 155 (e.g., actuated by the movement module 705). For example, the second preset motion may include a recapture step to reposition the magnetic mass 160 at the first position 725a, and simultaneously shake the IER 155 to recapture the magnetic material. For example, the second preset motion may include repeating the release step and the recapture step for multiple times (2, 3, 4, . . . , N times).

As an illustrative example, in the release step, the second preset motion may include shaking the IER 155 with the magnetic mass 160 being moved between the first position 725a and the second position 725b along a predetermined path (e.g., up and down direction, left and right direction) at a speed of 5 m/min to shake off the magnetic material attached to the IER 155. For example, the second preset motion may include shaking the IER 155 with the magnetic mass 160 in an off (e.g., demagnetized) position. For example, shaking the IER 155 may include moving the IER 155 up and down for a first predetermined duration (e.g., 10 seconds, 15 seconds, 20 seconds, 30 seconds, less than one minute) to release the magnetic material. In some implementations, the speed may be determined based on the test information 260. For example, a higher viscosity may require a reduced speed to reduce the frictional force between the rod-shaped sheath 715 and the mixture 125.

For example, in the recapture step, the second present motion may include holding the IER 155 at the center axis 710 for a second predetermined duration (e.g., 10 seconds, 15 seconds, 20 seconds, 30 seconds, less than one minute) with the magnetic mass 160 in an on (e.g., magnetizing) position to recapture the magnetic material suspended in the rinsing solution. For example, while the IER 155 is at the center axis 710, the IER 155 may be controlled to move up and down within the rinsing container to capture the magnetic impurities in the rinsing container. In various examples, the speed and time values may be varied based on the BBMS 130 and the target substances. In various examples, the first predetermined duration, the second predetermined duration, the predetermined path, and the predetermined speed may be selected based on non-target substances expected in the mixture 125 (e.g. the battery slurry).

In some implementations, the collection process 220 may be repeated multiple times by discarding the rinsing liquid having the non-target material released from the IER 155. For example, the rinsing liquid may be reintroduced to rinse the IER 155 again. For example, the number of repetitions may be from 3 to 10, without limitation. Other variations may also be possible.

In some implementations, a magnetic strength at the exterior surface of the rod-shaped sheath 715 may be adjusted through an operation of the position control bar 720. By adjusting a position of the magnetic mass 160 and a speed of moving of the IER 155, weakly magnetic, semi-ferromagnetic, and/or paramagnetic particles may also be captured. For example, a slowly moving IER 155 may advantageously maintain a magnetic strength of more than 5000 Gauss through the motion of the IER 155 to reduce the frictional force between the IER 155 and the rinsing liquid. Accordingly, an attraction force to non-magnetic impurities is greater than the friction force. For example, pure non-magnetic impurity particles (e.g., copper (Cu)) that are not magnetic at all may advantageously be collected by, for example, moving the IER 155 and/or the magnetic mass 160 slowly. Accordingly, for example, non-magnetic impurities alloys (e.g., Cu—Zn, Cu—Fe, Cu—Ni) in the BBMS 130 may advantageously be captured.

In some implementations, the IER 155 may be operated in the collection process 220 in the acid ionization unit 230. For example, the IER 155 may, after being rinsed off the non-target substance, be inserted into a container containing the acid treatment solution 165. For example, the IER 155 may be operated in a third preset motion. For example, the target substance captured by the IER 155 may be dissolved in the acid treatment solution 165.

In some implementations, the third preset motion may position the magnetic mass 160 at the second position 725b. For example, the IER 155 may be tilted and moved to first position 725a for a predetermined duration (e.g., 30 minutes, 2 hours, 4 hours). For example, the third preset motion may include a tilting motion of the user 115 with the magnetic mass 160 moved to the second position 725b for 1 minute.

Figure 7B:
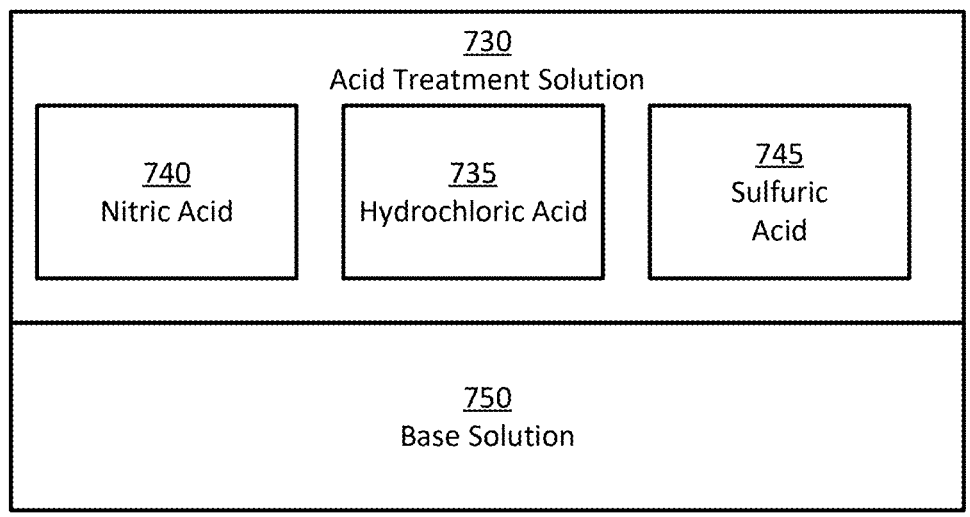
FIG. 7B and FIG. 7C depict an exemplary acid composition for a room temperature rapid impurity ionization process, and a sample rinsing solution, respectively.
Figure 7C:
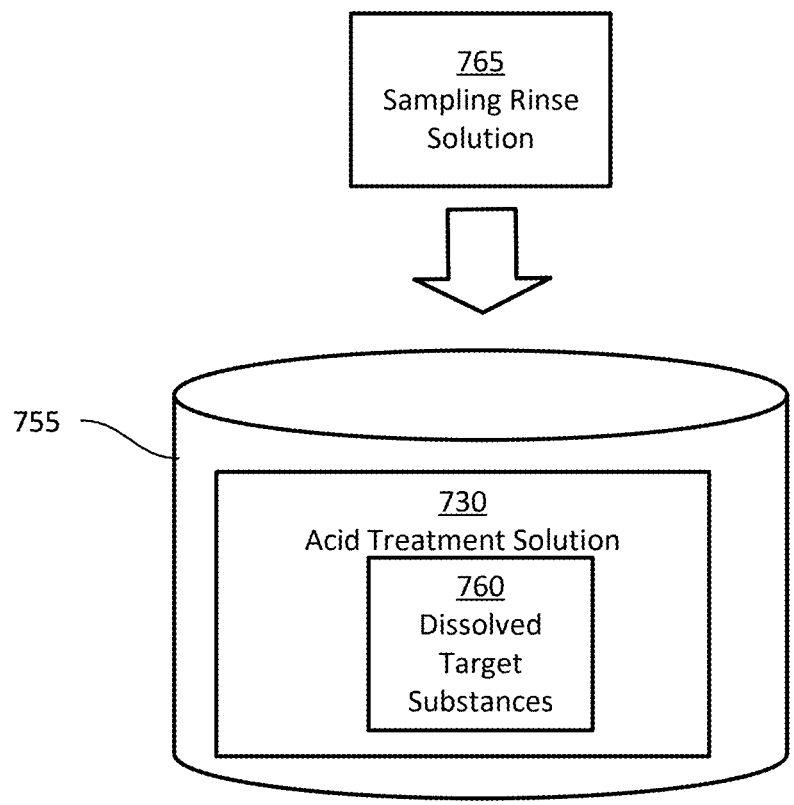

FIG. 7B and FIG. 7C depict an exemplary acid composition for a room temperature rapid impurity ionization process, and a sample rinsing solution, respectively. In the depicted example shown in FIG. 7B, an acid treatment solution 730 (e.g., the acid treatment solution 165 as described with reference to FIGS. 1-3) may advantageously dissolve the target substances (e.g., magnetic impurities) safely without excessive heating. For example, the target substances may include alloy (e.g., stainless steel). For example, the IER 155 may be inserted into the acid treatment solution 730 to dissolve objects that remain captured after the release process.

In this example, the acid treatment solution 730 includes a suitable concentration of hydrochloric acid 735 (HCl), nitric acid 740 ($HNO_3$), or a combinations thereof. For example, the acid treatment solution 730 may include 50% concentration of the hydrochloric acid 735 and the nitric acid 740. For example, a weight ratio between the hydrochloric acid 735 and the nitric acid 740 may be 1:1.

The acid treatment solution 730 includes a sulfuric acid 745. For example, the acid treatment solution 730 may include 20% concentration of the sulfuric acid 745. In some implementations, the acid treatment solution 730 may include 1%-20% concentration of the sulfuric acid 745. In some examples, the weight ratio between the hydrochloric acid 735, the nitric acid 740, and the sulfuric acid 745 may be 20:20:1. For example, the weight ratio between the hydrochloric acid 735, the nitric acid 740, and the sulfuric acid 745 may be 30:10:1.

In some implementations, the weight ratio between the hydrochloric acid 735 and the nitric acid 740 may first be controlled to be in the range within 1:1 and 3:1. For example, the sulfuric acid 745 may be added in small amounts. In some implementations, one part of the sulfuric acid 745 may be added to 15 parts of an acid having both the hydrochloric acid 735 and the nitric acid 740. In some implementations, the acid treatment solution 730 may include 0.5% of the sulfuric acid 745 if the acid is 20% concentrated. For example, the acid treatment solution 730 may include 2% of the sulfuric acid 745 if the acid is 98% concentrated.

In some implementations, the weight ratio of the hydrochloric acid and the nitric acid ranges from 1:1 to 3:1. For example, the acid treatment solution 730 may include 0.4%-2% of the sulfuric acid 745. For example, a sulfuric acid solution to be added to make the acid treatment solution may be 20% in acid concentration. For example, a sulfuric acid solution to be added to make the acid treatment solution may be 98% in acid concentration In some implementations, the acid treatment solution 730 may be added with a base solution 750. In some implementations, the base solution 750 may be added after the target substances are dissolved within the acid treatment solution 730 for a predetermined duration. For example, the base solution 750 may include a solution of sodium hydroxide (NaOH), potassium hydroxide (KOH), or a mixture of sodium hydroxide (NaOH) and potassium hydroxide (KOH) in appropriate proportions. For example, the base solution 750 may include sodium hydroxide (NaOH). For example, the base solution 750 may include potassium hydroxide (KOH). For example, the base solution 750 may include calcium hydroxide ($Ca(OH)_2$). For example, the base solution 750 may include magnesium hydroxide ($Mg(OH)_2$). For example, the base solution 750 may include barium hydroxide ($Ba(OH)_2$). For example, the base solution 750 may include lithium hydroxide (LiOH). For example, the base solution 750 may include aqueous solution of ammonia ($NH_4OH$). For example, the base solution 750 may include aluminum hydroxide ($Al(OH)_3$). For example, the base solution 750 may include sodium carbonate ($Na_2CO_3$), trisodium phosphate ($Na_3PO_4$), and/or a combination thereof. For example, a radio between the base solution 750 and the acid treatment solution 730 may be 1:2.

For example, the user 115 may adjust a specific pH or acid concentration of the acid treatment solution 730. In some implementations, the base solution 750 may include water. For example, the water may dilute a fully concentrated acid solution to 60-70% concentrated. For example, a less concentrated acid may advantageously be safer for the user 115.

In some implementations, the base solution 750 may raise a temperature of the acid treatment solution 730 by an acid-base reaction. For example, ammonia hydroxide may be used to induce a raise in temperature from room temperature to, for example, 40-90° C. As an illustrative example without limitation, the acid treatment solution 730 may include hydrochloric acid, nitric acid, and 25% sodium hydroxide in a weight ratio of 1:1:4. For example, the user 115 may be washed in a first acid treatment solution having the hydrochloric acid 735 and the nitric acid 740 in a 1:1 ratio under room temperature. Next, 25% sodium hydroxide may be added, for example, to raise the temperature of the acid treatment solution to 80 to 95 degrees C.

In some implementations, the acid treatment solution 730 may be adjustable based on the target substance to be dissolved (e.g., by adjusting the ratio of the hydrochloric acid 735 and the nitric acid 740). For example, the acid treatment solution 730 may include the base solution 750 substances configured to generate heat by an acid-base neutralization. For example, the acid treatment solution 730 may advantageously remove a requirement for a mechanical heat source (e.g., a hot plate) to be installed in the RHPIAS 300. For example, the acid treatment solution 730 may be adjustable to comply with (e.g., safety) acidity requirement of the user 115. In some examples, the acid treatment solution 730 may dissolve target substances from the IER 155 at room temperature (e.g., without direct heating) within 10 minutes.

In various implementations, an impurity rinsing method for rinsing target impurities from an impurity sample collection rod (e.g., the IER 155) may include steps of (1) placing the rod in a treatment solution may include nitric acid, hydrochloric acid, and sulfuric acid (e.g., the acid treatment solution 730), and maintain the rod in the treatment solution in room temperature for a maximum of 10 minutes. Various embodiments may advantageously provide solution samples for ICP analysis safely and quickly.

As shown in FIG. 7C, a sample container 755 (e.g., a rinsing cup collected at the output portal 110) may include the acid treatment solution 730 and dissolved target substances (DTS 760). In the collection process 220, the DTS 760 may be sampled by introducing a sampling rinse solution 765 to the sample container 755.

In some implementations, the sampling rinse solution 765 may be a solution for adjusting an appropriate pH value and an appropriate amount of solution for sampling the DTS 760. For example, the sampling rinse solution 765 may include deionized water. For example, the sampling rinse solution 765 may include ultrapure water. For example, the sampling rinse solution 765 may be generated to convert the acid treatment solution 730 to compile with a predetermined standard (e.g., 3%-10% acid). In some examples, the predetermined standard may be determined based on a safety standard. For example, the predetermined standard may be determined based on a requirement of subsequent analysis machine (e.g., an ICP machine).

In some implementations, the DTS 760 may be injected into a sample container (e.g., the conical tubes 135). For example, a predetermined amount of the sampling rinse solution 765 (e.g., deionized water) may be the sample container 755. For example, the IER 155, after the target substances are dissolved, may be inserted into the sample container 755 containing the sampling rinse solution 765. For example, the sampling rinse solution 765 may be injected into the sample container 755 for sampling. In various examples, the sampling rinse solution 765 may be injected to rinse the IER 155 multiple times (e.g., 3, 5, 7 times).

As an illustrative example without limitation, if a rinsing process is performed three times with deionized water, the total amount of the deionized water may be divided into a ratio of 4:3:2 between the first rinsing amount, the second rinsing amount, and the third rinsing amount. For example, a final sample solution in the sample container 755 may meet a predetermined pH value and a total amount of solution is suitable for a subsequent analysis method (e.g., the ICP method).

In some implementations, the base solution 750 and the acid treatment solution 730 may be around 95:100. For example, the acid treatment solution 730 may be heated by the acid-base reaction to almost boiling. For example, the acid-base solution may release water. For example, a final solution may advantageously be neutralized in acid value (e.g., less than 5% acid). For example, the final solution may then be ready to be analyzed directly without adding the sampling rinse solution 765.

Figure 8:
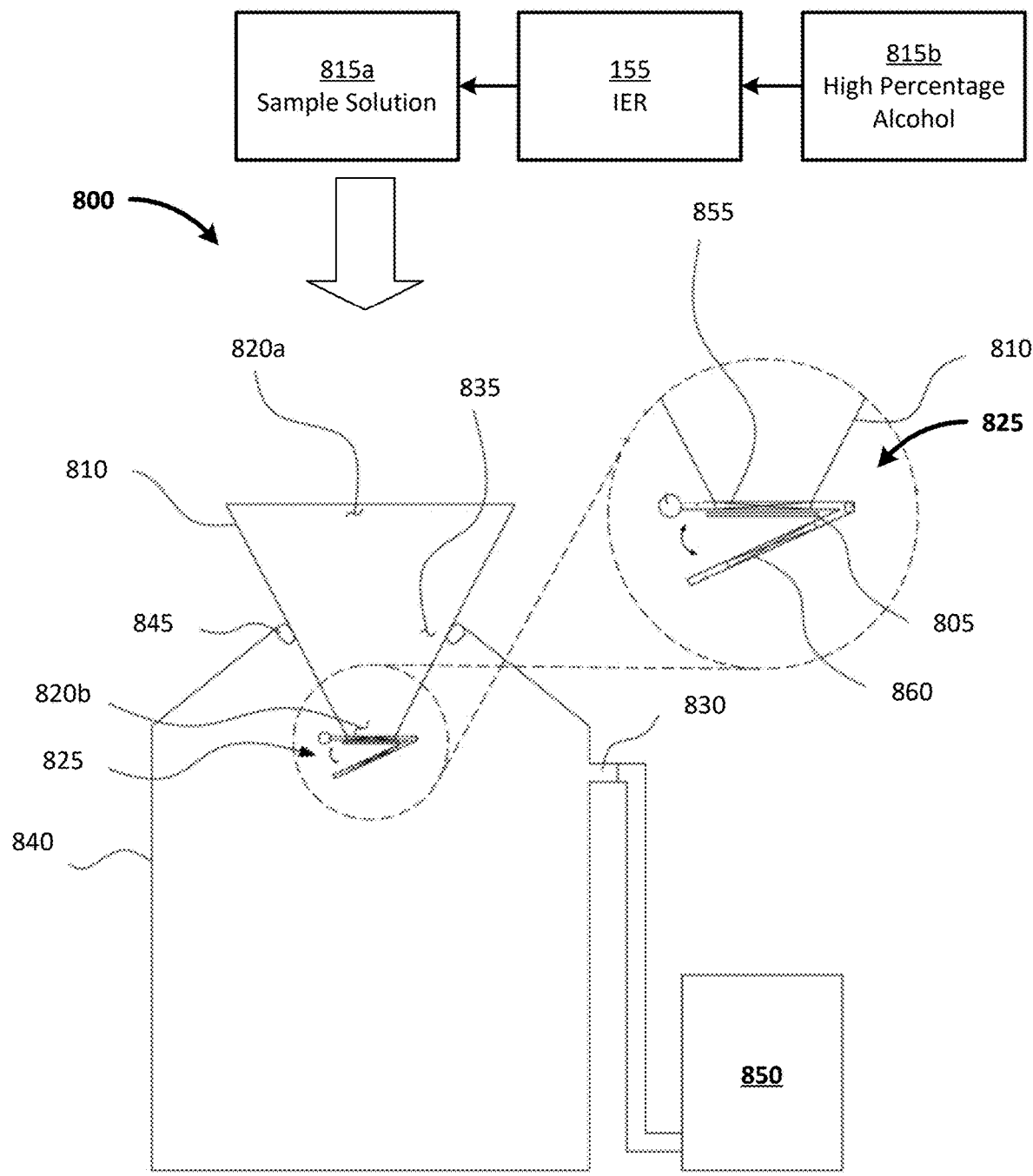
FIG. 8 depicts an exemplary impurity capture device (ICD).

FIG. 8 depicts an exemplary impurity capture device (ICD). In this example, the ICD 800 includes a filter paper 805 and a funnel 810. For example, the ICD 800 may generate solid samples for SEM analysis by funneling a sampling solution 815a through the filter paper 805. As shown, the sampling solution 815a is created by rinsing the IER 155 after the extraction process that retains only the target substances by a high percentage alcohol 815b. In this example, the ICD 800 receives the sampling solution 815a at the funnel 810.

As shown, the funnel 810 includes a top opening 820a and a bottom opening 820b. For example, the high percentage alcohol 815b may, after dispersing impurity particles in a solvent, be introduced through the top opening 820a to the bottom opening 820b. As shown, the ICD 800 includes a clip 825 configured to mount the filter paper 805.

The ICD 800 includes a tube 830 and a liquid injection opening 835. The ICD 800 includes a liquid collection container 840. The liquid collection container 840 includes an O-ring 845 coupled to the liquid injection opening 835. For example, the O-ring 845 may seal the liquid collection container 840 tightly (e.g., airtightly sealed) when it engages the funnel 810.

In some implementations, the sampling solution 815a may be a solution to be vacuum filtered. As shown, the ICD 800 includes a vacuum pump 850 coupled to the tube 830. For example, in operation, the vacuum pump 850 may reduce an (internal) air pressure in the liquid collection container 840.

For example, the top opening 820a may include a diameter of 50 to 100 mm. For example, the bottom opening 820b may include a diameter of 8 to 13 mm. In some implementations, a diameter of the top opening 820a may be larger than 50 mm to facilitate introduction of the sampling solution 815a. For example, a diameter of the bottom opening 820b diameter may be larger than 8 mm to reduce filtration time. For example, the funnel 810 may advantageously reduce layers of the impurity being distributed on the filter paper 805. For example, the diameter of the bottom opening 820b diameter may be less than 13 mm. For example, the funnel 810 may advantageously prevent the impurities being too widely distributed to hinder testing efficiency.

For example, the clip 825 may be made of a stiff material (e.g., polytetrafluoroethylene, polycarbonate). In some examples, the clip 825 may include stainless steel. As shown, the clip 825 includes a first hole 855 formed in a size equal to the diameter of the bottom opening 820b, and a second hole 860 formed in a size smaller than the diameter of the first hole 855. For example, the size of the diameter of the second hole 860 may be 0.8 times the size of the diameter of the first hole 855. For example, the size ratio between the first hole 855 and the second hole 860 may advantageously prevent the filter paper 805 from sagging in a filtration direction during a vacuum filtration process.

In some implementations, the liquid collection container 840 may include a material that does not deform or break upon depressurization of the vacuum pump 850 (e.g., polytetrafluoroethylene, polypropylene, polycarbonate, polyethylene terephthalate, polyethylene, glass, ceramic, alumina, or a combination thereof) In some implementations, the liquid collection container 840 may include polycarbonate, polyethylene terephthalate, polyethylene, glass, ceramic, alumina, or any combination thereof. For example, the vacuum pump 850 may include a decompression power to move liquid in the funnel 810 into the liquid collection container 840 within 30 seconds without damaging the filter paper 805.

As an illustrative example, when the sampling solution 815a is poured into the funnel 810 and the vacuum pump 850 is operated. The impurity particles may be, for example, captured on the filter paper 805. For example, the filter paper 805 may subsequently be dried. For example, after drying, the filter paper 805 may include a solid sample of the target substances rinsed off from the IER 155.

In some implementations, the high percentage alcohol 815b may include an alcohol-based solvent having a purity of 97% or more. For example, the high percentage alcohol 815b may include an alcohol-based solvent having a purity of 50% or more. For example, the high percentage alcohol 815b may be ethanol. For example, the high percentage alcohol 815b may be methanol. For example, the high percentage alcohol 815b may be isopropyl. For example, the high percentage alcohol 815b may be other alcohol (e.g., butanol) In some implementations, the high percentage alcohol 815b may be replaced by non-alcoholic solvents with low surface tension (e.g., acetone, water with surfactant, NMP (N-Methyl-2-pyrrolidone)).

For example, using the high percentage alcohol 815b, the impurities may, at the filtration process, be evenly spread in a monolayer on the filter paper 805 due to a low surface tension of the alcohol-based solvent. In some implementations, the high percentage alcohol 815b may evaporate quickly at normal (e.g., room) temperature and (e.g., atmospheric) pressure. Various embodiments may advantageously reduce contamination and improve assessment accuracy.

PON1E: The mass is translated to a demagnetizing position in the rod, and the target impurities on the rod are rinsed with a solution onto a filter paper through a vacuum filtration process. For example, the impurities are captured by the filter paper to be directly placed in an element diagnostic machine for a further analysis.

As shown, a target impurity rinsing process 865 may be performed by inserting the IER 155 into a container having the high percentage alcohol 815b. For example, the IER 155 may be shaken (e.g., up and down) within the container. After a predetermined of time, the container may include the high percentage alcohol 815b having the target substances and the high percentage alcohol 815b. For example, the sampling solution 815a may then be poured into the funnel 810 for sample collection.

In some examples, the target impurity rinsing process 865 may be performed by spraying the IER 155 with the high percentage alcohol 815b. For example, the high percentage alcohol 815b may wash out the target substances on the IER 155 and become the sampling solution 815a. For example, the sampling solution 815a may directly flow into the funnel 810 for sample collection. In some examples, the high percentage alcohol 815b in this method may require to be lower in alcohol content to prevent flaming during a spraying process.

Figure 9:
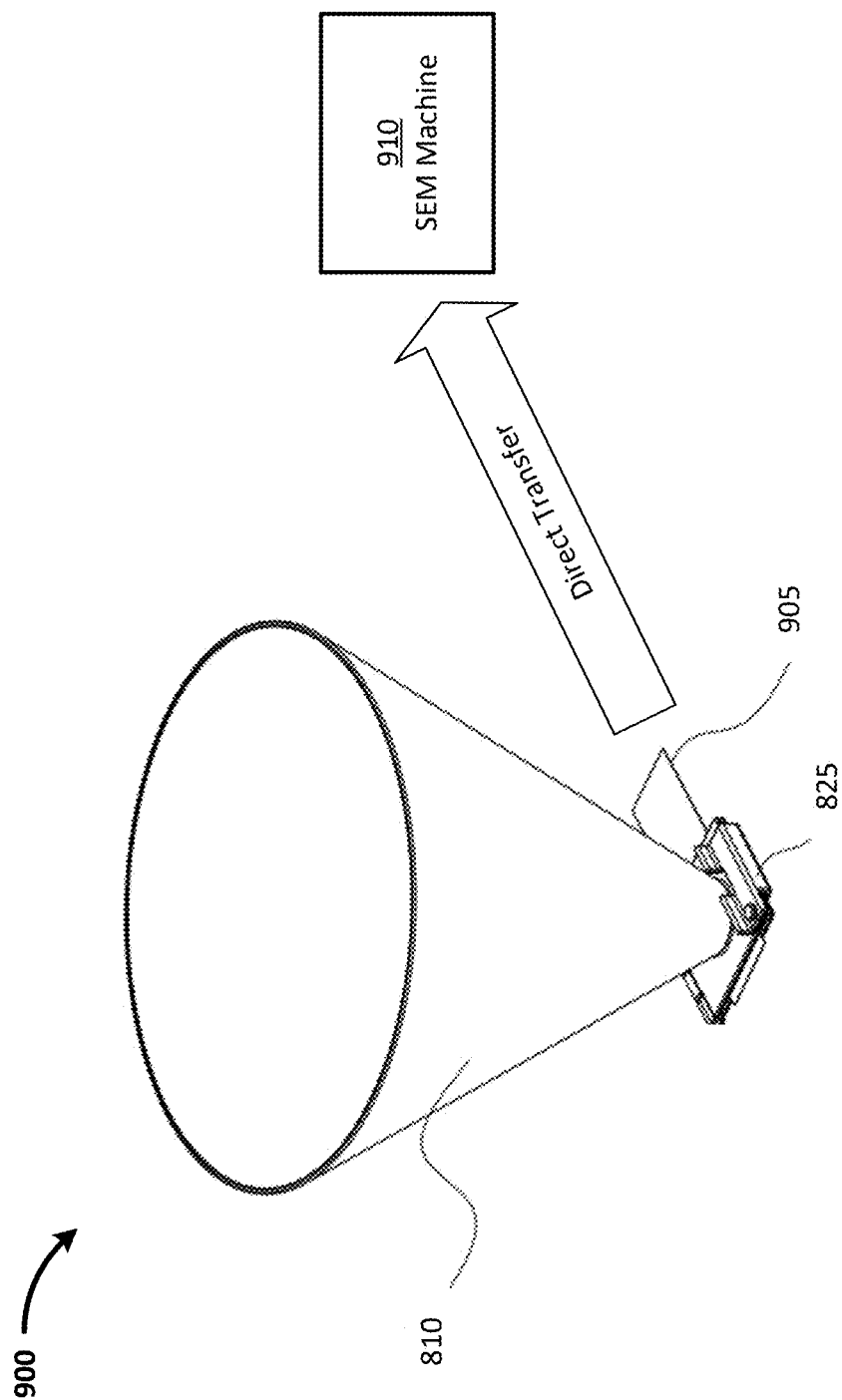
FIG. 9 depicts an exemplary collection funnel and clip structure for the ICD described with reference to FIG. 8.

FIG. 9 depicts an exemplary collection funnel and clip structure for the ICD described with reference to FIG. 8. In this example, a funnel and clip structure (FACS 900) includes the funnel 810 and the clip 825. A conductive filter paper 905 is fixed at a bottom of the funnel 810. For example, the conductive filter paper 905 may include a carbon-based filter paper.

In some implementations, a size of the conductive filter paper 905 may be 10 to 15 mm across and 20 to 50 mm long. For example, the conductive filter paper 905 may be formed larger than the size of the bottom opening 820b. In some implementations, the conductive filter paper 905 may include a pore size of 0.1 to 0.45 μm. For example, the pore size may be customized to suit the specific needs of a current test. For example, a smaller pore size may advantageously allow for a slower filtration rate but more particles to be filtered out (e.g., generating a higher throughput). In some examples, a larger pore size may advantageously allow a faster filtration rate and reduce sampling time. For example, the larger pore sizes may advantageously allow filtration of powdery materials (e.g., anode active material primary particles, the BBMS 130) to obtain a higher percentage of the target impurities. In some implementations, the conductive filter paper 905 may include a layer of adhesive (e.g., a layer of Polyvinyl alcohol (PVA) adhesive) to advantageously increase a particle retention rate. In some examples, the conductive filter paper 905 may advantageously collect the target substances in a monolayer.

In some examples, the conductive filter paper 905 may be configured to directly place in a SEM machine 910 for SEM analysis. Accordingly, for example, the FACS 900 may advantageously eliminate a need to transfer solid impurities from a sample collection device to a separate carbon tape.

In various implementations, the conductive filter paper 905 may be (inherently) conducting to prevent charge accumulation on the surface of impurity samples. For example, the conductive filter paper 905 may advantageously enable more accurate and clearer images to be obtained during a (subsequent) SEM analysis. For example, the conductive filter paper 905 may be a graphene filter paper and a gold coating. For example, the conductive filter paper 905 may be a tungsten mesh. For example, the conductive filter paper 905 may be thin (e.g., less than 20 μm thick) to facilitate drying speed. For example, the conductive filter paper 905 may be 10-12 μm thick. For example, the conductive filter paper 905 may be dried within 5 minutes after filtering the high percentage alcohol 815b.

In some implementations, a non-conductive filter membrane may be used in place of the conductive filter paper 905. For example, the non-conductive filter membrane may include a Polyvinylidene Fluoride Polyimide membrane. For example, the non-conductive filter membrane may be less than 9 μm. In some examples, the non-conductive filter membrane may, after the vacuum filtering process and the drying process, be adhered to a conductive layer (e.g., a carbon-based paper) for the subsequent SEM analysis. For example, the non-conductive filter membrane may combine with the conductive layer at a bottom surface.

Figure 10:
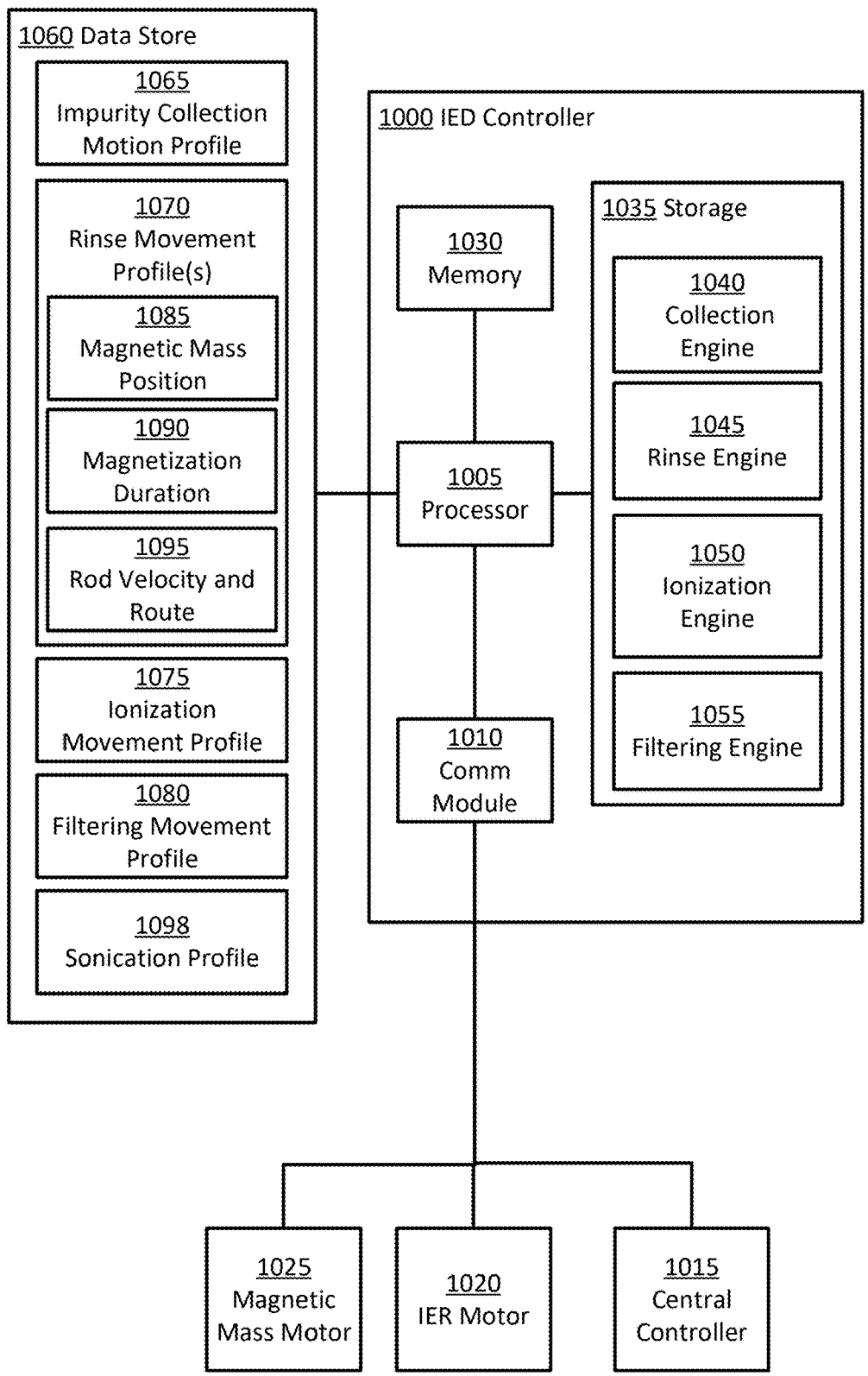
FIG. 10 is a block diagram depicting an exemplary IED controller.

FIG. 10 is a block diagram depicting an exemplary IED controller. For example, an IED controller 1000 as shown may control the impurity extraction machine as described with reference to FIGS. 1-3. As shown in this example, the IED controller 1000 includes a processor 1005. The processor 1005 may, for example, include one or more processing units. The processor 1005 is operably coupled to a communication module 1010. The communication module 1010 may, for example, include wired communication. The communication module 1010 may, for example, include wireless communication. In the depicted example, the communication module 1010 is operably coupled to a central controller 1015, an IER motor 1020, and a magnetic mass motor 1025.

For example, the IED controller 1000 may receive control signals from the central controller 1015. For example, the central controller 1015 may transmit instructions to the IED controller 1000 to start various subprocesses in a target impurity collection process. Based on the instructions, for example, the IED controller 1000 may control the IER motor 1020 and the magnetic mass motor 1025. For example, the IED controller 1000 may control the central controller 1015 and the IER motor 1020 to perform the first, second, and third preset motions. For example, the movement module 705 may include the IER motor 1020. For example, the magnetic mass motor 1025 may be coupled to the position control bar 720 configured to control the position of the magnetic mass 160.

The processor 1005 is operably coupled to a memory module 1030. The memory module 1030 may, for example, include one or more memory modules (e.g., random-access memory (RAM)). The processor 1005 includes a storage module 1035. The storage module 1035 may, for example, include one or more storage modules (e.g., non-volatile memory). In the depicted example, the storage module 1035 includes a collection engine 1040, a rinse engine 1045, an ionization engine 1050, and a filtering engine 1055.

For example, the collection engine 1040 may be configured to control the IER 155 to collect impurities from the mix container 120. For example, the rinse engine 1045 may be configured to control the IER 155 to undergo a rinsing process to remove non-target substances from the IER 155. For example, the ionization engine 1050 may be configured to control the IER 155 to discharge the target substances into the acid treatment solution 730. For example, the filtering engine 1055 may be configured to control the IER 155 to allow rinsing by the sampling solution 815a to the ICD 800.

The processor 1005 is further operably coupled to a data store 1060. The data store 1060 includes an impurity collection motion profile 1065, a rinsing movement profile 1070, an ionization movement profile 1075, and a filtering movement profile 1080. For example, the collection engine 1040 may control the magnetic mass motor 1025 and the IER motor 1020 according to the impurity collection motion profile 1065 during an impurity collection process.

In some implementations, the impurity collection motion profile 1065 may include a stirring step. For example, the impurity collection motion profile 1065 may include inserting the IER 155 into the mix container 120. For example, the impurity collection motion profile 1065 may include a first motion to control the IER motor 1020 to stir the mixture 125 in the mix container 120 while the magnetic mass motor 1025 is positioned in an off position. For example, the impurity collection motion profile 1065 may include positioning the IER 155 at the center axis 710 while the magnetic mass motor 1025 is moved to an ON position to capture magnetic impurities in the mixture 125.

For example, the rinse engine 1045 may control the magnetic mass motor 1025 and the IER motor 1020 according to the rinsing movement profile 1070 during a rinsing process. For example, the rinsing movement profile 1070 may include controlling the IER 155 in multiple cycles of rinsing motion. In this example, each rinsing movement profile 1070 includes a magnetic mass position 1085, a magnetizing duration 1090, and a rod velocity and route (RVAR 1095). As described with reference to FIG. 7A-C, the IED controller 1000 may control the IER 155 and the magnetic mass 160 in multiple cycles. For each cycle, the rinse engine 1045 may, according to the rinsing movement profile 1070 of the cycle, operate the IER 155 and the magnetic mass 160 with the position of the mass, a duration of magnetization, and a rod movement based on the magnetic mass position 1085, the magnetizing duration 1090, and the RVAR 1095.

For example, the magnetic mass position 1085 may control a final position of the magnetic mass 160 along a curvilinear path within the rod-shaped sheath 715. For example, the final position may affect a magnetic strength at the exterior of the rod-shaped sheath 715. For example, the magnetizing duration 1090 may control a duration within the cycle that the magnetic mass 160 is at the distal end of the IER 155. For example, a shorter duration may prevent the IER 155 from attracting weaker magnetic particles (e.g., the paramagnetic particles).

The RVAR 1095, for example, may control the movement of the IER 155 to advantageously reduce frictional force between the IER 155 and the rinsing liquid. Accordingly, an attraction force to non-magnetic impurities is greater than the friction force. For example, the RVAR 1095 may advantageously capture non-magnetic impurities alloys (e.g., Cu—Zn, Cu—Fe, Cu—Ni).

For example, the ionization engine 1050 may control the magnetic mass motor 1025 and the IER motor 1020 according to the ionization movement profile 1075 during an acid ionization process. For example, the ionization movement profile 1075 may include inserting the IER 155 into the rinse container 615. For example, the ionization movement profile 1075 may include operating the magnetic mass motor 1025 is positioned in a (magnetic) off position. For example, the ionization movement profile 1075 may include holding the IER 155 in the rinse container 615 for a predetermined duration (e.g., 2 minutes, 3 minutes, 10 minutes).

For example, the filtering engine 1055 may control the magnetic mass motor 1025 and the IER motor 1020 according to the filtering movement profile 1080 during a sample filtration process. For example, the filtering movement profile 1080 may include tilting the IER 155 into an angle to facilitate flowing of the sampling solution 815a on the exterior of the rod-shaped sheath 715 and towards the ICD 800. For example, the filtering movement profile 1080 may include operating the magnetic mass motor 1025 is positioned in a (magnetic) off position.

Figure 11:
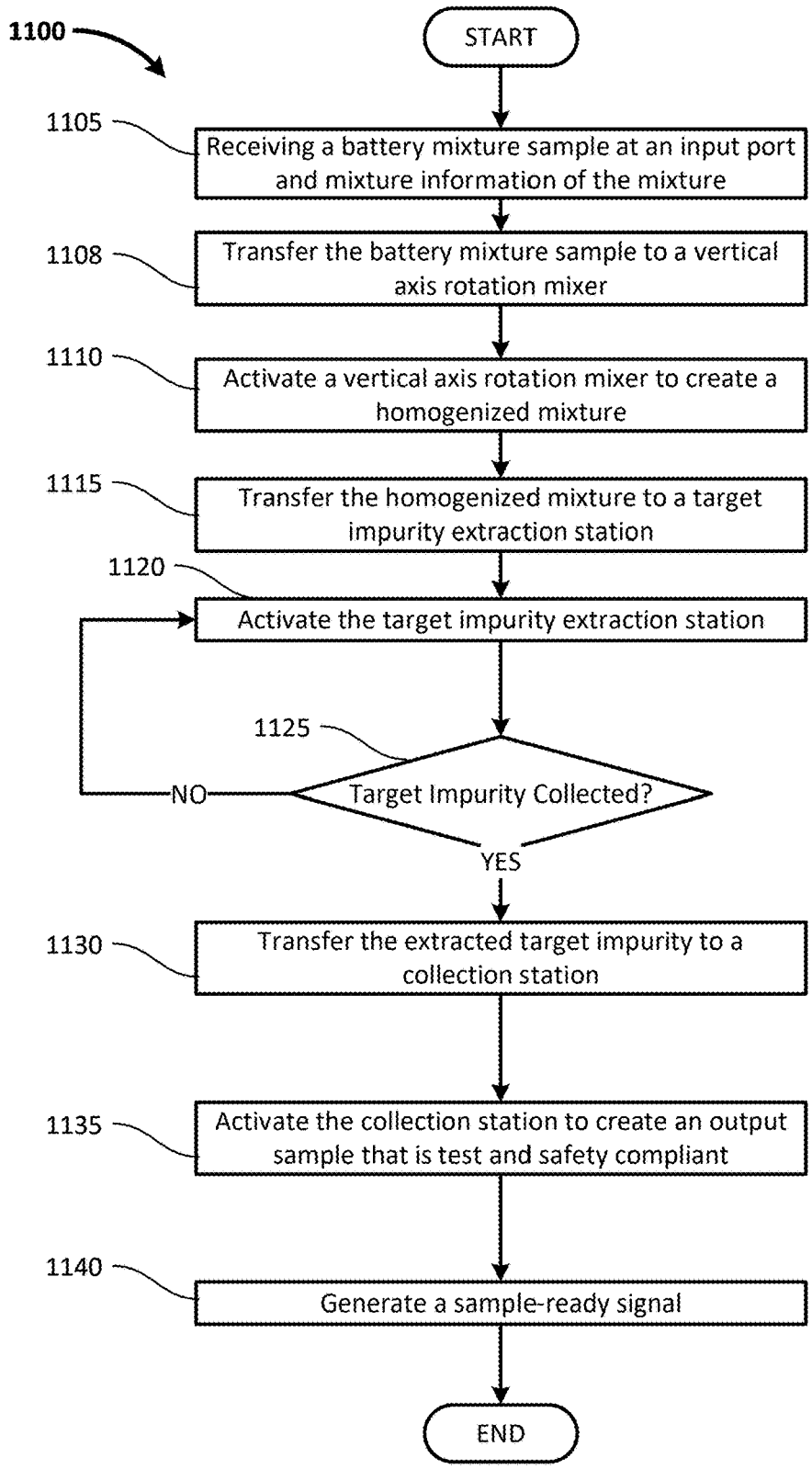
FIG. 11 is a flowchart illustrating an exemplary rapid high precision battery powder impurity assessment method.

FIG. 11 is a flowchart illustrating an exemplary rapid high precision battery powder impurity assessment method. For example, a method 1100 may be performed by a controller of the RHPIAS 300 to extract an impurity sample to be filled in the container 320. For example, the method 1100 may be performed by the BITCPU 200 to generate the assessment result 255. For example, the method 1100 may be performed by the RHPIAS 100 to create samples at the output portal 110.

In this example, the method 1100 begins when a battery mixture sample is received at an input port along with mixture information in step 1105. For example, the BITCPU 200 may receive the BBMS 130 at the output portal 110 in the mix container 120. For example, the BITCPU 200 may collect the BBMS information via a user interface or by a scanning device (e.g., the sensor unit 515, the data input device 520). For example, the mixture information may include the type and concentration of the materials involved. Next, in step 1108, the battery mixture sample is transferred to a vertical axis rotation mixer. For example, the robotic arm 305 may transfer the mix container 120 from the input portal 105 to the mixing module 140.

In step 1110, the vertical axis rotation mixer is activated to homogenize the mixture. For example, the BITCPU 200 may control the exemplary MAMU controller 500 to rotate the mix container 120 based on the movement profile 150 selected based on the test information 260. Next, in step 1115, the homogenized mixture is transferred to a target impurity extraction station. For example, the robotic arm 305 may move the mix container 120 to the TICU 600.

Next, the target impurity extraction station is activated in step 1120. For example, the BITCPU 200 may initiate the extraction process 210 using the IED 700 to capture magnetic impurities from the mixture in the mix container 120, and extract the target substances from the magnetic impurities according to the MMMP 215.

At a decision point 1125, it is determined whether the target impurity has been collected. For example, the BITCPU 200 may assess whether the impurities have been successfully captured by the IER 155 based on feedback from sensors in the system (e.g., internal and/or external to the BITCPU 200). For example, the BITCPU 200 may receive a user feedback on whether the target substance is collected. If the target impurities have not been collected, the step 1120 is repeated.

In step 1130, if the target impurities have been collected, the target impurity is transferred to a collection station. For example, the conveyor system 610 may move the IER 155 to an acid ionization station or the ICD 800 for sample collection.

In step 1135, the collection station is activated to create a compliant output sample. For example, the BITCPU 200 may control the collection station to perform any additional rinsing, drying, or filtering needed to prepare the sample for analysis. For example, the compliant output sample may be within a predetermined pH range. For example, the compliant output sample may be directly applicable to subsequent testing (e.g., ICP analysis, SEM analysis, XRF analysis).

In step 1140, a sample-ready signal is generated and the method 1100 ends. For example, once the collection process 220 is completed, the BITCPU 200 may send a signal indicating the sample is ready at the output portal 110 for analysis and/or further processing.

Figure 12:
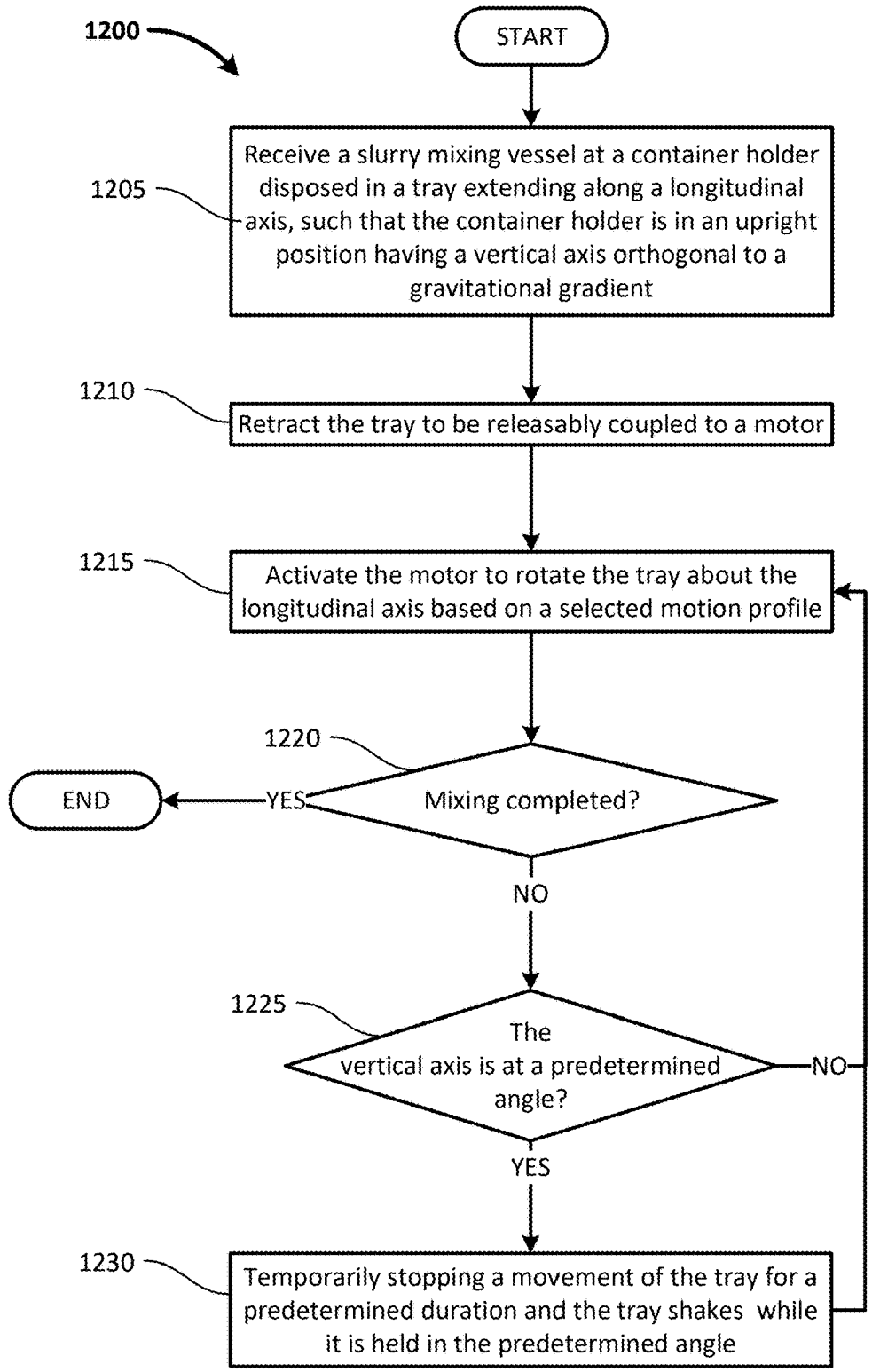
FIG. 12 is a flowchart illustrating an exemplary battery powder and impurity mixing method.

FIG. 12 is a flowchart illustrating an exemplary battery powder and impurity mixing method. For example, a method 1200 may be performed by the exemplary MAMU controller 500 to create a homogenization of the mixture 125. For example, the method 1200 may be performed at the step 1120 in the method 1100.

In this example, the method 1200 begins in step 1205 when a slurry mixing vessel is received at a container holder disposed in a tray extending along a longitudinal axis. For example, the container holder is in an upright position having a vertical axis orthogonal to a gravitational gradient. For example, the MAMU controller 500 may receive a signal indicating that the mixing vessel 410 is properly positioned in one of the container compartments 445. For example, the vertical axis 440 of the mixture 125 may be orthogonal to a gravitational gradient.

In step 1210, the tray is retracted to be releasably coupled to a motor. For example, the MAMU controller 500 may receive a signal indicating that and the tray 425 is retracted to connect with the motor 415. Next, the motor is activated to rotate the tray about the longitudinal axis based on a selected motion profile in step 1215. For example, the MME 545 may select the movement profile 150 to control the motor 415. For example, the MME 545 may select the movement profile 150 based on a type, a concentration, and viscosity of the mixture 125.

At a decision point 1220, it is determined whether the mixing is completed. For example, the MAMU controller 500 may determine that the mixing is complete when a predetermined agitation duration (e.g., 1 minute, 3 minutes, 5 minutes or more) is completed. For example, sensors in the MAMU controller 500 may adaptively monitor the homogeneity of the mixture using the sensor unit 515 and determine if the mixing meets the predetermined criteria. If the mixing is completed, the method 1200 ends.

If the mixing is not completed, at a decision point 1225, it is determined whether the vertical axis is at a predetermined angle. For example, the MAMU controller 500 may use angular position sensors (e.g., position sensors, hall sensors) to detect whether the vertical axis 440 has rotated to a specified angular position (e.g., θ=180°). If the vertical axis is not at the predetermined angle, the step 1215 is repeated.

If the vertical axis is at the predetermined angle, in step 1230, the movement of the tray is temporarily stopped for a predetermined duration while it is held in the predetermined angle. For example, the MAMU controller 500 may pause the rotation of the tray 425 based on the movement profile 150, allowing the mixture to settle before continuing the rotation. For example, the temporary stopping may advantageously eliminate a gravitational bottom of the mix container 120. After the predetermined duration, the step 1215 is repeated. For example, the tray 425 may shake the mixing vessel 410 when the rotation stops. Based on a structure of the coupling 460, the tray 425 may oscillate back and forth for 4-6°. For example, the oscillation may shake off material suspended at an upper surface (originally a container bottom) of the mixing vessel 410.

Figure 13:
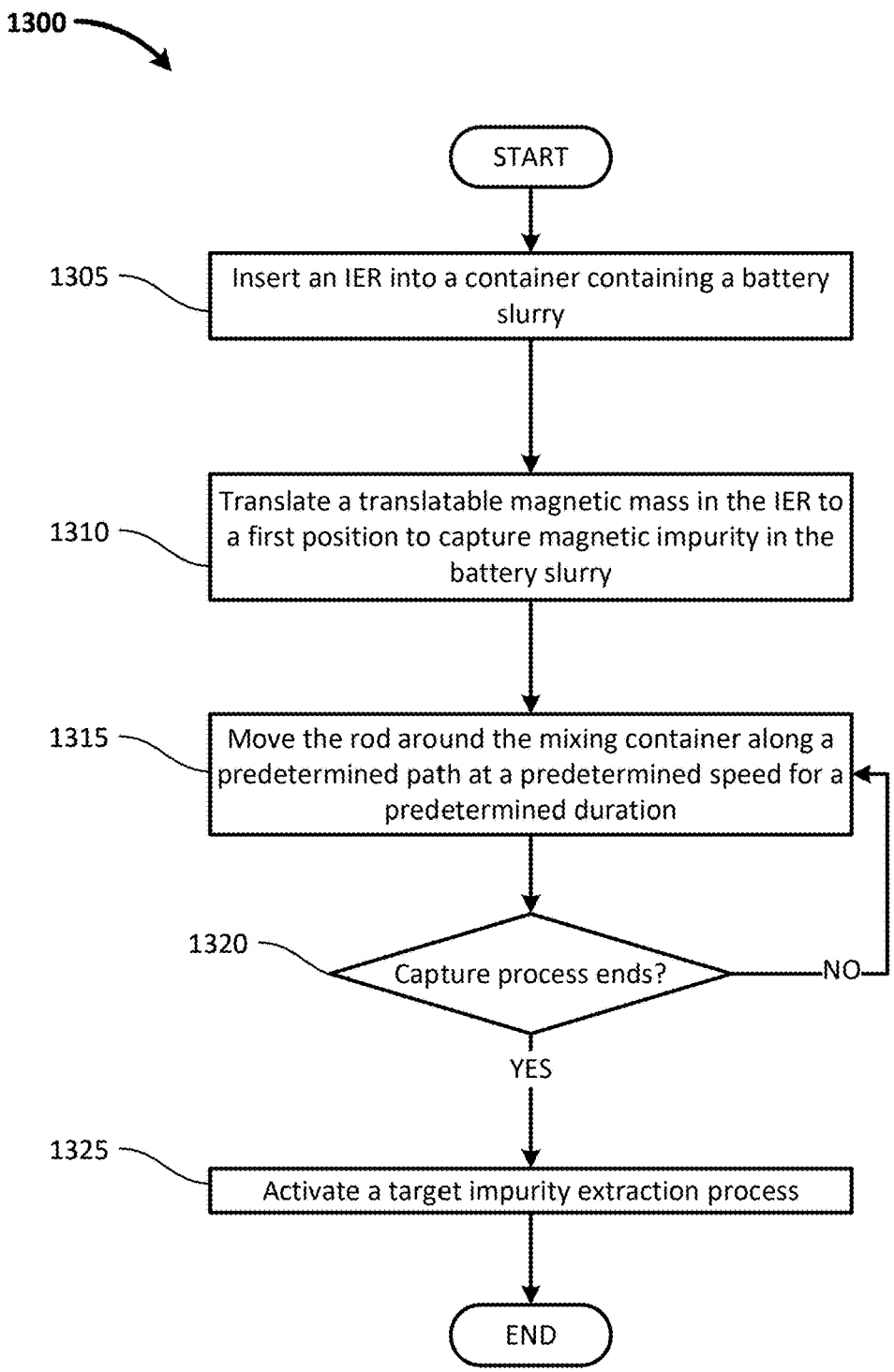
FIG. 13 is a flowchart illustrating an exemplary magnetic impurity capture method.

FIG. 13 is a flowchart illustrating an exemplary target impurity capture method. For example, the IED controller 1000 may perform a method 1300 as shown. For example, the IED controller 1000 may control the IER 155 in the first preset motion to capture magnetic impurities from the mixture 125 in the mix container 120. In this example, the method 1300 begins (step 1305) when the IER is inserted into a container containing a battery slurry. For example, the IED controller 1000 may instruct the movement module 705 to insert the IER 155 into the mix container 120 holding the battery slurry with battery materials and dispersants.

In step 1310, a translatable magnetic mass in the IER is translated to a first position to capture magnetic impurities in the battery slurry. For example, the magnetic mass 160 inside the IER 155 may be moved to its first position by the position control bar 720 along a curvilinear path. For example, at the distal end of the IER 155, the magnetic mass 160 may generate a highest magnetic field at an exterior surface of the rod-shaped sheath 715, capturing magnetic impurities in the mixture 125 (e.g., a thoroughly mixed battery slurry by the agitation device 400) to be captured at the exterior surface of the rod-shaped sheath 715.

Next, in step 1315, the IER is moved around the mixing container along a predetermined path at a predetermined speed for a predetermined duration. For example, the IER 155 may be moved by the movement module 705 along a predetermined three-dimensional path. For example, the movement module 705 may rotate the IER 155 about the central axis 710 at a speed determined by the IED controller 1000. For example, the predetermined speed may be determined from the impurity collection motion profile 1065. For example, the movement module 705 may move the IER 155 up and down. For example, the movement module 705 may control the IER 155 to tap a bottom of the container. For example, the movement module 705 may control the IER 155 to rotate about an axis with variable diameters. In some implementations, the variable diameters may be determined by a size of the movement module 705. For example, the IER 155 may self-rotate about the rod-shaped sheath 715.*a*

At a decision point 1320, it is determined whether the capture process is complete. For example, the IED controller 1000 may assess sensor feedback and/or timing parameters to determine if the magnetic impurities have been sufficiently captured. If the process is not complete, the step 1315 is repeated.

If the capture process is complete, in step 1325, a target impurity extraction process is activated, and the method 1300 ends. For example, the IED controller 1000 may trigger the rinse engine 1045 to extract the target substances from the magnetic impurities captured by the collection engine 1040.

Figure 14:
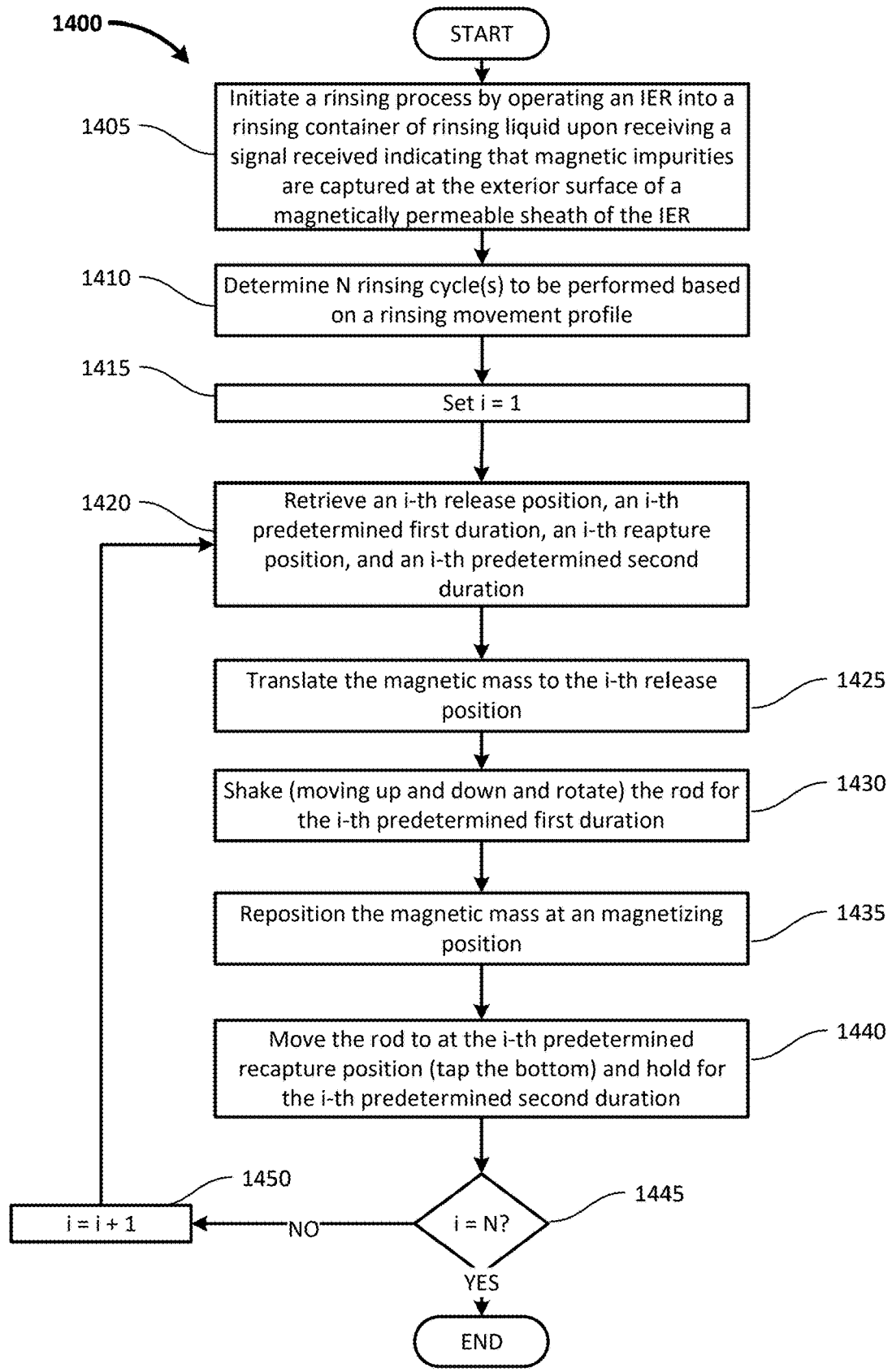
FIG. 14 is a flowchart illustrating an exemplary target magnetic impurity extraction method.

FIG. 14 is a flowchart illustrating an exemplary target magnetic impurity extraction method. For example, a method 1400 may be performed by the IED controller 1000 to control the IER 155 to release non-targeted substances (e.g., the paramagnetic impurities) from the exterior surface while retaining the target substances (e.g., the ferromagnetic impurities). In this example, the method 1400 begins in step 1405 when a rinsing process is initiated by operating an IER into a rinsing container of rinsing liquid upon receiving a signal received indicating that magnetic impurities are captured at the exterior surface of a magnetically permeable sheath of the IER. For example, the IED controller 1000 may receive a signal from the collection engine 1040, indicating that magnetic impurities are present on the exterior surface of the IER 155.

In step 1410, the number of rinsing cycles (N) to be performed is determined based on a rinsing movement profile. For example, the rinse engine 1045 of the IED controller 1000 may determine the number of cycles required based on the rinsing movement profile 1070 stored in the data store 1060.

In step 1415, a cycle counter is initialized by setting i=1. For example, the IED controller 1000 may set an internal counter for the first rinsing cycle.

In step 1420, an i-th release position, an i-th predetermined first duration, an i-th recapture position, and an i-th predetermined second duration are retrieved. For example, the IED controller 1000 may retrieve the corresponding release and recapture positions, along with the associated durations, from the rinsing movement profile 1070 in the data store 1060.

Next, in step 1425, the magnetic mass is translated to the i-th release position. For example, the position control bar 720 of the IER 155 may be operated by the IER motor 1020 to move the magnetic mass 160 within the rod-shaped sheath 715 to a specified release position (e.g., away from the distal end of the IER 155, according to the magnetic mass position 1085).

In step 1430, the rod is shaken (e.g., moving up and down and rotating about the center axis 710) for the i-th predetermined first duration. For example, the movement module 705 may translate the IER 155 up and down, and rotating about the center axis 710 at a predetermined speed for the specified duration along a predetermined path according to the RVAR 1095 to release the non-target substances from the rod.

In step 1435, the magnetic mass is repositioned at a magnetizing position. For example, the position control bar 720 may be used to move the magnetic mass 160 back to the first position to prepare for recapturing target materials.

In step 1440, the rod is moved (e.g., to tap a bottom surface of the rinsing container 615) to the i-th predetermined recapture position and held for the i-th predetermined second duration. For example, the movement module 705 may move the IER 155 to a recapture position where it can re-attract target magnetic impurities by moving the IER 155 up and down for the predetermined time (e.g., according to the magnetizing duration 1090).

At a decision point 1445, it is determined whether the current rinsing cycle is the last one (i=N). For example, the IED controller 1000 may check the internal counter against the total number of rinsing cycles determined in step 1410. If the cycle count has not reached N, the cycle counter is incremented by 1 in step 1450, and the step 1420 is repeated. If the cycle count (i) has reached N, the method 1400 ends. For example, the IER 155 may proceed to a subsequent process, such as being transferred to a different station for further analysis or cleaning. For example, the IED controller 1000 may trigger the filtering engine 1055 to begin a filtration or ionization process.

Figure 15:
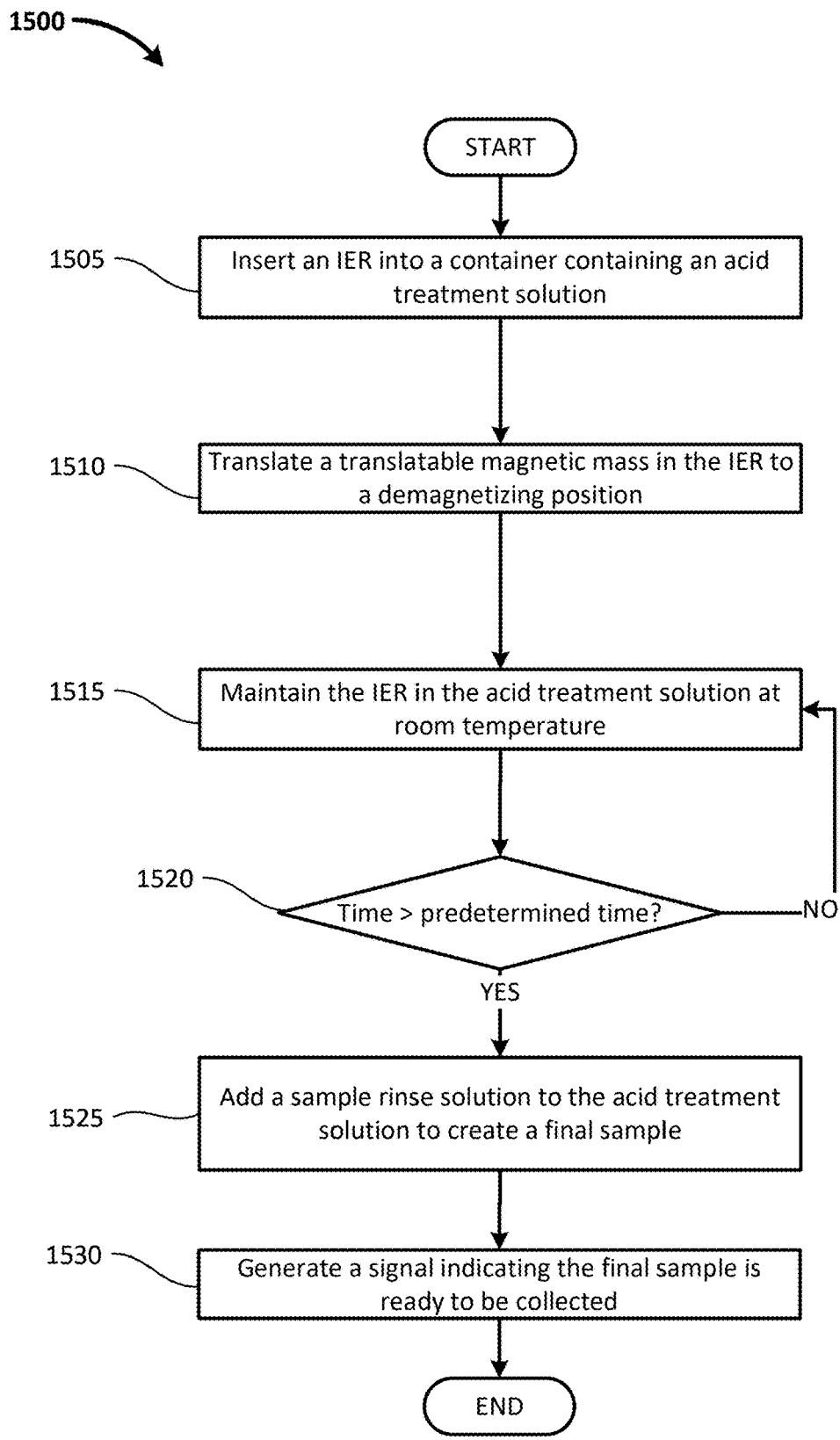
FIG. 15 is a flowchart illustrating an exemplary room temperature acid ionization method.

FIG. 15 is a flowchart illustrating an exemplary room temperature acid ionization method. For example, the BITCPU 200 may perform a method 1500 as shown in the acid ionization unit 230. In this example, the method 1500 begins in step 1505 when an IER is inserted into a container containing an acid treatment solution. For example, the IED controller 1000 may insert the IER 155 into a container that holds the acid treatment solution 165 as described with reference to above.

In step 1510, a translatable magnetic mass in the IER is translated to a demagnetizing position. For example, the position control bar 720 may be activated by the magnetic mass motor 1025 to move the magnetic mass 160 along a curvilinear path inside the rod-shaped sheath 715 to a demagnetizing position. For example, the magnetic mass 160 may be held in the ON position when the IER 155 is being submerged into the acid treatment solution 730 to prevent the target substances to be released too early on a surface of the acid treatment solution 730.

In step 1515, the IER is maintained within the acid treatment solution at room temperature. For example, the IED controller 1000 may maintain the IER 155 in the acid treatment solution at room temperature (e.g., 15-30° C.). At a decision point 1520, it is determined whether the predetermined time has passed. For example, the IED controller 1000 may use an internal timer to check whether a set time (e.g. determined by the ionization movement profile 1075, 2-10 minutes) for the acid ionization process has been completed. If the time has not passed, the step 1515 is repeated.

Next, a base solution is added in a step. For example, the base solution 750 may be added to the acid treatment solution 730 to raise a temperature. For example, the base solution 750 may be added to generate water to neutralize an acidity of the acid treatment solution 730.

If the predetermined time has passed, in 1525, a sample rinse solution is added to the acid treatment solution to create a final sample. For example, a quantity of the sample rinse solution (e.g., deionizing water) may be determined to maintain the final sample in a suitable quantity and acidity. Next, in step 1530, a signal is generated indicating that the final sample is ready to be collected, and the method 1500 ends. For example, the IED controller 1000 may generate a signal (e.g., a visual indicia at a user interface, a data signal) to notify a control system (e.g., the BITCPU 200) and/or the user 115 that the sample is ready for collection at the output portal 110. For example, the sample may be directly used in the ICP machine 245

Figure 16:
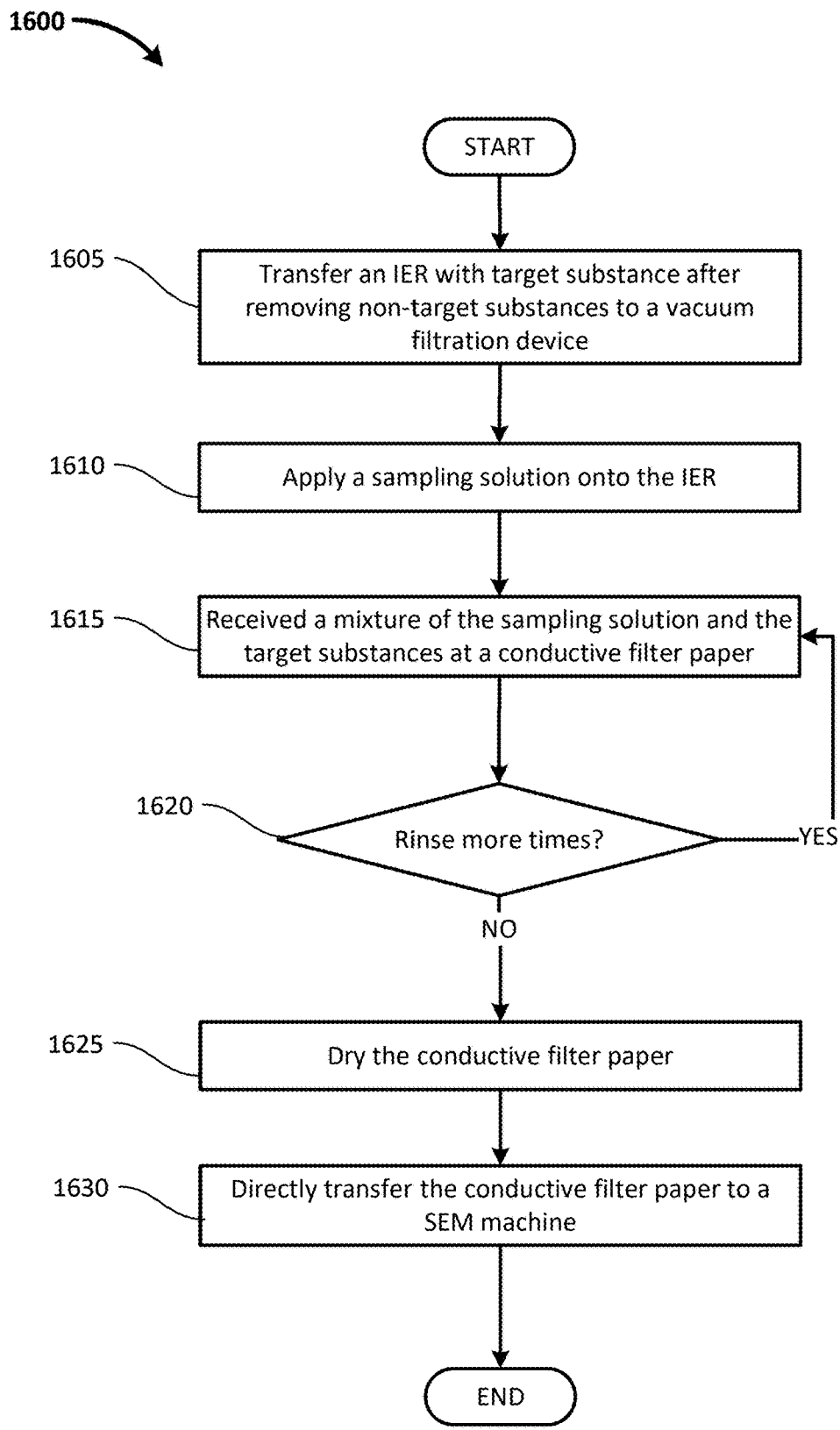
FIG. 16 is a flowchart illustrating an exemplary solid sample collection method.

FIG. 16 is a flowchart illustrating an exemplary solid sample collection method. For example, a method 1600 may be performed by the BITCPU 200 using the ICD 800 to generate a solid sample on a filter paper suitable for the SEM machine 240. In this example, the method 1600 begins when an IER containing a target substance, after the removal of non-target substances, is transferred (step 1605) to a vacuum filtration device. For example, the BITCPU 200 may move the IER 155 to the filter sampling unit 225 (e.g., the ICD 800).

In step 1610, a sampling solution to the IER is applied based on a target impurity rinsing process. For example, as discussed with reference to FIG. 8, the IER 155 may be rinsed by spraying a sampling solution over it. For example, as discussed with reference to FIG. 8, the IER 155 may be rinsed by pouring a sampling solution over it. For example, as discussed with reference to FIG. 8, the IER 155 may be rinsed by first submerge the IER 155 with the target impurity within the high percentage alcohol 815b and release the target substances by turning off a magnetic field at the rod-shaped sheath 715, pouring the resulting solution (e.g., the sampling solution 815a) onto the filter paper 805 through the funnel 810. For example, the high percentage alcohol 815b may be applied to the IER 155. In step 1615, the mixture of the sampling solution and the target substances is received on a conductive filter paper. For example, the filter paper 805 may receive the sampling solution 815a through the funnel 810.

At a decision point 1620, it is determined whether additional rinsing cycles are necessary. For example, the BITCPU 200 may include a filtration profile indicating a number of rinsing to be performed to the IER 155. If more rinsing is required, the step 1610 is repeated.

If no more rinsing is needed, in step 1625, the conductive filter paper is dried. For example, the high percentage alcohol 815b may quickly dried in room temperature due to its high alcohol content. Next, the conductive filter paper is directly transferred to a SEM machine for analysis in step 1630 and the method 1600 ends. For example, the BITCPU 200 may signal that the sample is ready for immediate transfer to the SEM machine 240 for detailed scanning electron microscopy.

In some implementations, in the rinsing process, the IER 155 may be subjected to a sonic wave between 20 Hz to 100 Hz. For example, the magnetic mass 160 may be maintained at an ON (e.g., magnetizing) position. For example, the sonic wave may knock off the non-target substances are knocked off. For example, the sonic wave frequency may be selected based on (e.g., magnetic properties) of a substance aimed to be rinsed from the IER 155.

Figure 17:
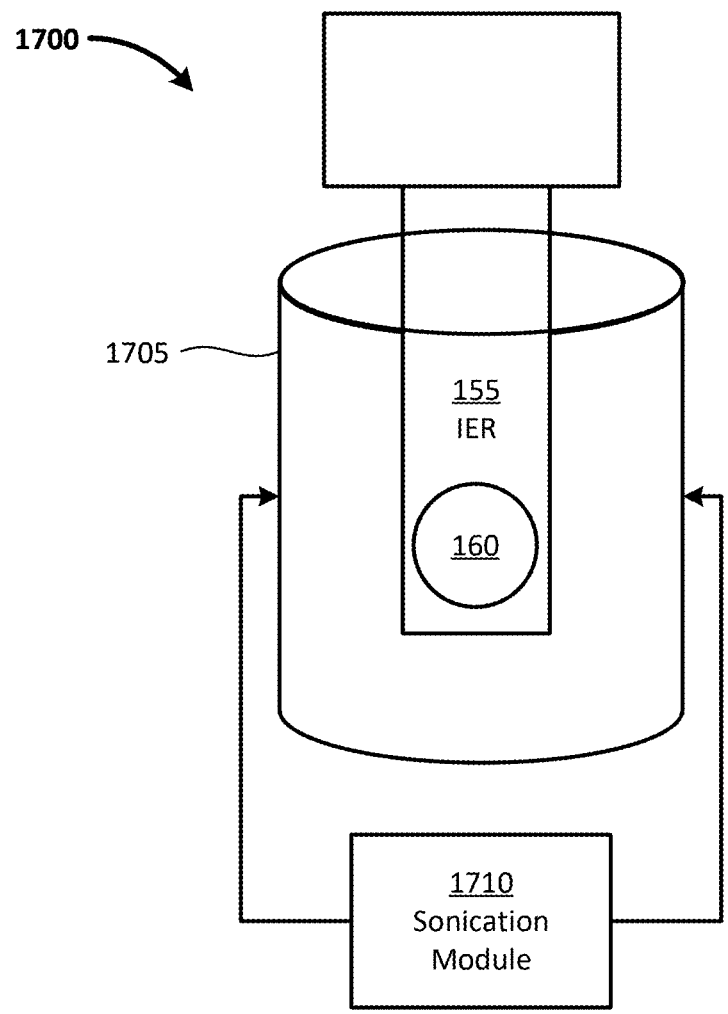
FIG. 17 shows an exemplary sonication system.

FIG. 17 shows an exemplary sonication system 1700. In this example, the exemplary sonication system 1700 may include a sonication container 1705 and a sonication module 1710. For example, the sonication container 1705 may be a container having a considerable depth. For example, the sonication module 1710 may be connected to a side of the sonication container 1705 to apply a sonic wave to the sonication module 1710.

As shown, the IER 155 is inserted into the sonication container 1705 with the magnetic mass 160 at the distal end of the IER 155. For example, the magnetic mass 160 may hold the magnetic impurities collected in the mixture 125. In some examples, the sonication module 1710 may selectively generate a sonic wave to knock of non-target substances based on size and/or magnetic strength. Various embodiments may advantageously provide a robust method to knock off non-target substances accurately and improve overall battery material test precision.

Figure 18:
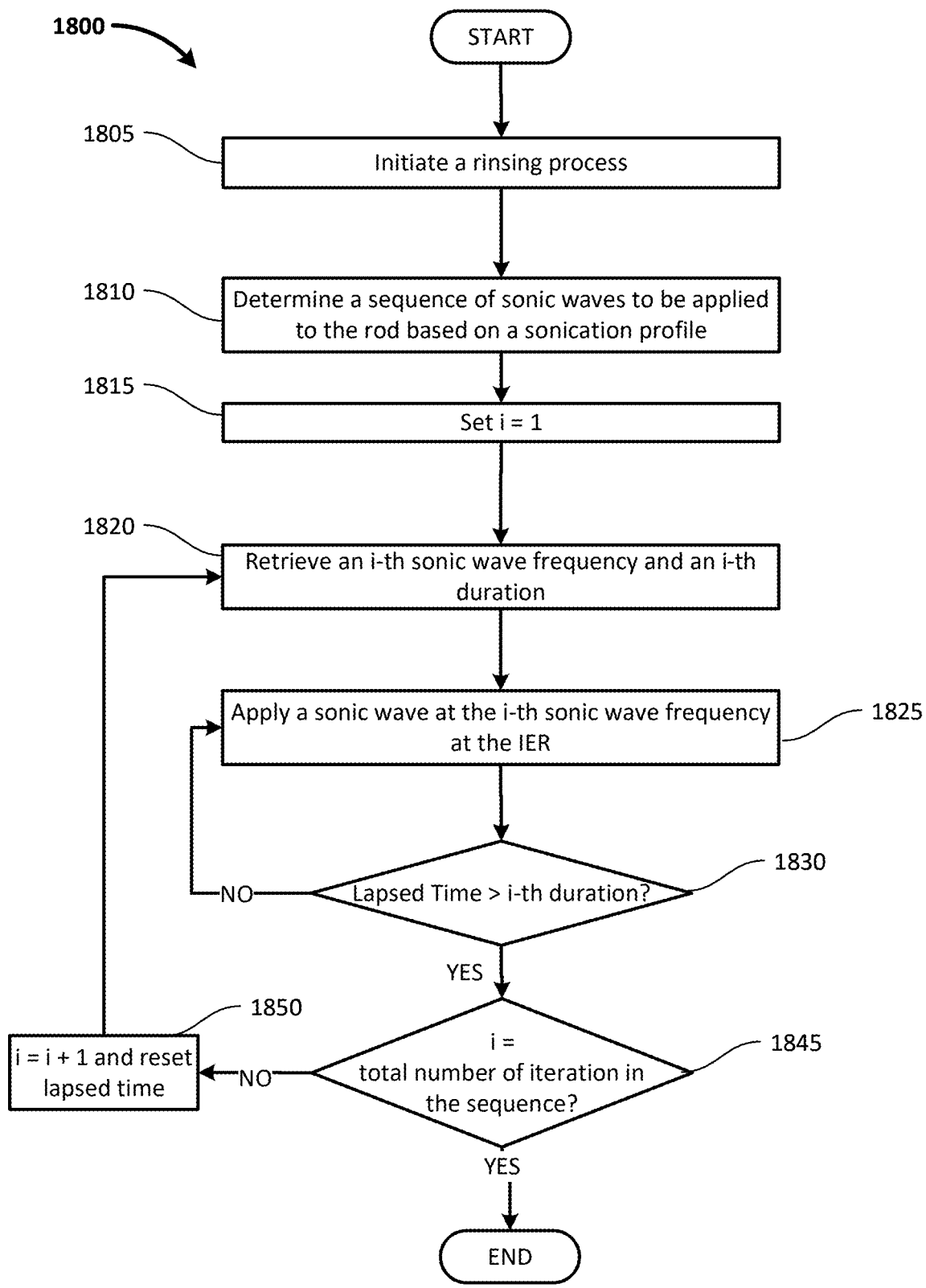
FIG. 18 is a flowchart illustrating an exemplary extraction by sonication method.

FIG. 18 is a flowchart illustrating an exemplary extraction by sonication method. For example, a method 1800 may be performed by the sonication module 1710 to release (e.g., knock off) non-targeted substances (e.g., the paramagnetic impurities) from the exterior surface of the IER. In this example, the method 1800 begins in step 1805 when a rinsing process is initiated. For example, the rinsing process may be initiated upon receiving an IER in a rinsing container. For example, the sonication module 1710 may receive a signal when the IER 155 is inserted into the sonication container 1705. For example, the rinsing process may be initiated when the sonication module 1710 receives a signal indicating magnetic impurities are captured at the rod-shaped sheath 715.

In step 1810, a sequence of sonic waves is determined to be applied to the rod based on a sonication profile (e.g., sonication profile 1098). For example, the sonication profile may be stored in the data store 1060. For example, the sonication module 1710 may retrieve predefined sonic wave parameters stored from a data store. For example, the sonication module 1710 may select a sequence that matches the properties of the captured impurities for removal based on the mixture information received from the user 115.

In step 1815, the index variable "i" is set to 1. For example, the sonication module 1710 may initialize the index to begin an iterative process of sonic wave application. Next, an i-th sonic wave frequency and an i-th duration are retrieved in step 1820. For example, the sonication module 1710 may access the sonication profile to extract the i-th frequency.

In step 1825, a sonic wave at the i-th sonic wave frequency is applied to the IER. For example, the sonication module 1710 may emit sonic waves to the IER 155 at the specified frequency to agitate impurities on the rod-shaped sheath 715.

At a decision point 1830, it is determined whether the time is greater than the i-th duration. For example, the IED controller 1000 may compare the current operation time against the retrieved i-th duration to ensure that the sonication process is performed for the correct amount of time.

If a lapsed time is not greater than the i-th duration, the step 1825 is repeated. If the lapsed time is greater than the i-th duration, at a decision point 1845, it is determined whether "i" is equal to "N," where "N" represents the total number of sonic wave sequences in the profile. For example, the IED controller 1000 may check if the current sonic wave application index has reached the final entry in the sequence stored in memory.

If "i" is equal to "N," the method 1800 ends. If "i" is not equal to "N," in step 1850, the index "i" is incremented by 1 and the lapsed time is reset, and the step 1820 is repeated. For example, the IED controller 1000 may increment the index to proceed to the next sonic wave sequence in the sonication profile.

Although various embodiments have been described with reference to the figures, other embodiments are possible. In some implementations, an effect of the acid treatment solution 730 may vary by changing a composition (e.g., weight ratio), a duration for dissolving the target impurities, and an order of adding the various acids (e.g., the hydrochloric acid 735, the nitric acid 740, and the sulfuric acid 745), and the base solution 750. In some examples, the base solution 750 may be added only 2-5 minutes after the acid treatment solution 730 is allowed to react with the target impurities. Various embodiments may advantageously robustly dissolve metallic impurity's oxide layer on a surface of a target impurity (e.g., a metallic alloy).

For example, the standard size (capacity) of the mix container 120 may be 50 ml, 100 ml, 250 ml, 500 ml, 1 L, 2 L. For example, the mix container 120 may include a height to diameter ratio of about 2:1 to 3:2. In some implementations, the mix container 120 may be equipped with a removable magnetic module at the bottom of the mix container 120, which allows for the separate collection of magnetic impurities during the mixing process.

In some implementations, the agitation device 400 may include a leveling unit. For example, the leveling unit may be mounted at the bottom the agitation device 400 configured to level an installation surface (e.g., the ground 470) of the agitation device 400 when the installation surface is uneven.

In some implementations, the magnetic mass 160 may be software controlled. For example, the magnetic mass 160 may include an electromagnet.

Although an exemplary system has been described with reference to the figures, other implementations may be deployed in other industrial, scientific, medical, commercial, and/or residential applications. For example, the systems and method as described in the figures may be applicable to assess impurities in liquid. For example, some industries (e.g., food, medical, electronic, semiconductor, other industries) may require one or more liquid materials to have no metallic particles. For example, the liquid materials may be mixed and tested by the BITCPU 200.

In various embodiments, some bypass circuits implementations may be controlled in response to signals from analog or digital components, which may be discrete, integrated, or a combination of each. Some embodiments may include programmed, programmable devices, or some combination thereof (e.g., PLAs, PLDs, ASICs, microcontroller, microprocessor), and may include one or more data stores (e.g., cell, register, block, page) that provide single or multi-level digital data storage capability, and which may be volatile, non-volatile, or some combination thereof. Some control functions may be implemented in hardware, software, firmware, or a combination of any of them.

Computer program products may contain a set of instructions that, when executed by a processor device, cause the processor to perform prescribed functions. These functions may be performed in conjunction with controlled devices in operable communication with the processor. Computer program products, which may include software, may be stored in a data store tangibly embedded on a storage medium, such as an electronic, magnetic, or rotating storage device, and may be fixed or removable (e.g., hard disk, floppy disk, thumb drive, CD, DVD).

Although an example of a system, which may be portable, has been described with reference to the above figures, other implementations may be deployed in other processing applications, such as desktop and networked environments.

Temporary auxiliary energy inputs may be received, for example, from chargeable or single use batteries, which may enable use in portable or remote applications. Some embodiments may operate with other DC voltage sources, such as (nominal) batteries, for example. Alternating current (AC) inputs, which may be provided, for example from a 50/60 Hz power port, or from a portable electric generator, may be received via a rectifier and appropriate scaling. Provision for AC (e.g., sine wave, square wave, triangular wave) inputs may include a line frequency transformer to provide voltage step-up, voltage step-down, and/or isolation.

Although particular features of an architecture have been described, other features may be incorporated to improve performance. For example, caching (e.g., L1, L2, . . . ) techniques may be used. Random access memory may be included, for example, to provide scratch pad memory and or to load executable code or parameter information stored for use during runtime operations. Other hardware and software may be provided to perform operations, such as network or other communications using one or more protocols, wireless (e.g., infrared) communications, stored operational energy and power supplies (e.g., batteries), switching and/or linear power supply circuits, software maintenance (e.g., self-test, upgrades), and the like. One or more communication interfaces may be provided in support of data storage and related operations.

Some systems may be implemented as a computer system that can be used with various implementations. For example, various implementations may include digital circuitry, analog circuitry, computer hardware, firmware, software, or combinations thereof. Apparatus can be implemented in a computer program product tangibly embodied in an information carrier, e.g., in a machine-readable storage device, for execution by a programmable processor; and methods can be performed by a programmable processor executing a program of instructions to perform functions of various embodiments by operating on input data and generating an output. Various embodiments can be implemented advantageously in one or more computer programs that are executable on a programmable system including at least one programmable processor coupled to receive data and instructions from, and to transmit data and instructions to, a data storage system, at least one input device, and/or at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, which may include a single processor or one of multiple processors of any kind of computer. Generally, a processor will receive instructions and data from a read-only memory or a random-access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including, by way of example, semiconductor memory devices, such as EPROM, EEPROM, and flash memory devices; magnetic disks, such as internal hard disks and removable disks; magneto-optical disks; and CD-ROM and DVD-ROM disks. The processor and the memory can be supplemented by, or incorporated in, ASICs (application-specific integrated circuits).

In some implementations, each system may be programmed with the same or similar information and/or initialized with substantially identical information stored in volatile and/or non-volatile memory. For example, one data interface may be configured to perform auto configuration, auto download, and/or auto update functions when coupled to an appropriate host device, such as a desktop computer or a server.

In some implementations, one or more user-interface features may be custom configured to perform specific functions. Various embodiments may be implemented in a computer system that includes a graphical user interface and/or an Internet browser. To provide for interaction with a user, some implementations may be implemented on a computer having a display device. The display device may, for example, include an LED (light-emitting diode) display. In some implementations, a display device may, for example, include a CRT (cathode ray tube). In some implementations, a display device may include, for example, an LCD (liquid crystal display). A display device (e.g., monitor) may, for example, be used for displaying information to the user. Some implementations may, for example, include a keyboard and/or pointing device (e.g., mouse, trackpad, trackball, joystick), such as by which the user can provide input to the computer.

In various implementations, the system may communicate using suitable communication methods, equipment, and techniques. For example, the system may communicate with compatible devices (e.g., devices capable of transferring data to and/or from the system) using point-to-point communication in which a message is transported directly from the source to the receiver over a dedicated physical link (e.g., fiber optic link, point-to-point wiring, daisy-chain). The components of the system may exchange information by any form or medium of analog or digital data communication, including packet-based messages on a communication network. Examples of communication networks include, e.g., a LAN (local area network), a WAN (wide area network), MAN (metropolitan area network), wireless and/or optical networks, the computers and networks forming the Internet, or some combination thereof. Other implementations may transport messages by broadcasting to all or substantially all devices that are coupled together by a communication network, for example, by using omni-directional radio frequency (RF) signals. Still other implementations may transport messages characterized by high directivity, such as RF signals transmitted using directional (i.e., narrow beam) antennas or infrared signals that may optionally be used with focusing optics. Still other implementations are possible using appropriate interfaces and protocols such as, by way of example and not intended to be limiting, USB 2.0, Firewire, ATA/IDE, RS-232, RS-422, RS-485, 802.11 a/b/g, Wi-Fi, Ethernet, IrDA, FDDI (fiber distributed data interface), token-ring networks, multiplexing techniques based on frequency, time, or code division, or some combination thereof. Some implementations may optionally incorporate features such as error checking and correction (ECC) for data integrity, or security measures, such as encryption (e.g., WEP) and password protection.

In various embodiments, the computer system may include Internet of Things (IoT) devices. IoT devices may include objects embedded with electronics, software, sensors, actuators, and network connectivity which enable these objects to collect and exchange data. IoT devices may be in-use with wired or wireless devices by sending data through an interface to another device. IoT devices may collect useful data and then autonomously flow the data between other devices.

Various examples of modules may be implemented using circuitry, including various electronic hardware. By way of example and not limitation, the hardware may include transistors, resistors, capacitors, switches, integrated circuits, other modules, or some combination thereof. In various examples, the modules may include analog logic, digital logic, discrete components, traces and/or memory circuits fabricated on a silicon substrate including various integrated circuits (e.g., FPGAs, ASICs), or some combination thereof. In some embodiments, the module(s) may involve execution of preprogrammed instructions, software executed by a processor, or some combination thereof. For example, various modules may involve both hardware and software.

In an illustrative aspect, a magnetic impurity sample collection device may include a movement module. The movement module may include a motor unit. For example, the magnetic impurity sample collection device may include a rod extending in a longitudinal axis coupled to the movement module.

For example, the rod may include a magnetic mass disposed at a distal end of the rod. For example, the rod may include a position control bar coupled to the movement module and the magnetic mass. For example, the rod may include a magnetically permeable sheath encapsulating the magnetic mass and the position control bar. For example, the motor unit may be configured to selectively translate the magnetic mass along a curvilinear path within the magnetically permeable sheath, The magnetically permeable sheath may include a variable thickness along the longitudinal axis. For example, at the distal end of the rod corresponding to a first position of the magnetic mass, an effective magnetic field at an exterior surface of the magnetically permeable sheath may vary from at least a first strength capable of attracting paramagnetic impurities to a second strength at a second position smaller than the first strength.

For example, the movement module may include a central axis (710). For example, the motor unit may be configured to translate the rod along a horizontal plane orthogonal to the longitudinal axis, translate the rod parallel to the longitudinal axis, circulate the rod along the horizontal plane at a diameter within a predetermined maximum diameter from the central axis, rotate the rod about the central axis.

For example, the magnetically permeable sheath may include a monotonically decreasing from a proximal end to the distal end of the rod.

For example, the second position may be determined to be above a predetermined fill level of a container after the rod may be inserted into the container.

For example, the variable thickness may be less than 1.2 mm thick at the distal end of the rod.

In an illustrative aspect, a first targeted magnetic impurity extraction system may include the magnetic impurity sample collection device as described. For example, the targeted magnetic impurity extraction system may include a data store including a program of instructions. For example, the targeted magnetic impurity extraction system may include a processor operably coupled to the movement module of the magnetic impurity sample collection device configured to operate the motor unit, and the data store. For example, when the processor executes the program of instructions, the processor causes operations to be performed to automatically extract a target magnetic substance from a battery slurry.

For example, the operations may include, in response to a signal indicating magnetic impurities are captured at the exterior surface of the magnetically permeable sheath, initiate a rinsing process by operating the magnetic impurity sample collection device into a rinsing container may include a rinsing liquid. For example, the operations may include operate the magnetic mass and the rod in at least one rinsing cycle, each may include a release step and a recapture step.

For example, for an i-th cycle of the at least one rinsing cycle, the release step may include translate the magnetic mass to an i-th release position For example, the effective magnetic field at the exterior surface of the magnetically permeable sheath may be less than the first strength. For example, the release step may include shake the rod for an i-th predetermined first duration.

For example, the recapture step may include reposition the magnetic mass at the first position. For example, the recapture step may include move the rod to an i-th predetermined recapture position and hold for an i-th predetermined second duration. For example, a target magnetic material may be recaptured.

For example, move the rod to at an i-th predetermined recapture position may include tapping a bottom of the rinsing container.

For example, shake the rod may include rotate the rod about the central axis in a predetermined speed.

In an illustrative aspect, a second targeted magnetic impurity extraction system may include the magnetic impurity sample collection device according to above. The targeted magnetic impurity extraction system may include a data store may include a program of instructions. For example, the targeted magnetic impurity extraction system may include a processor operably coupled to the movement module of the magnetic impurity sample collection device configured to operate the motor unit, and the data store. For example, when the processor executes the program of instructions, the processor causes operations to be performed to automatically extract a target magnetic substance from a battery slurry For example, the operations may include:
(a) in response to a signal indicating magnetic impurities are captured at the exterior surface of the magnetically permeable sheath, initiate a rinsing process by operating the magnetic impurity sample collection device into a rinsing container may include a rinsing liquid while maintaining the magnetic mass at the first position;
(b) determine a sequence of sonic waves to be applied to the rod based on a sonication profile may include, for each sonic wave of the sequence, a sonic wave frequency and a duration;
(c) apply a first sonic wave frequency to the rod for a first duration;
(d) apply a next sonic wave frequency to the rod for a next duration; and,
(e) repeat (d) until the sequence of sonic waves is completed. For example the sequence of sonic waves may include at least two sonic wave frequencies between 20 Hz and 100 Hz.

For example, the operations of the first or second targeted magnetic impurity extraction system may include, in a capture process before the rinsing process, insert the rod into a mixing container. For example, the operations may include perform a preset capture motion. For example, the present capture motion may include translate the magnetic mass to the first position. For example, the present capture motion may include move the rod around the mixing container along a predetermined path at a predetermined speed for a predetermined duration. For example the magnetic impurities in the battery slurry is captured on the exterior of the magnetically permeable sheath.

For example, the operations may include, before translating the magnetic mass to the first position, operate the magnetic mass in a demagnetized state at the second position, and rotate the rod at a diameter about the central axis. For example, battery materials and dispersant of the slurry are mixed.

The operations of the first or second targeted magnetic impurity extraction system may include, after the rinsing process, insert the rod into an acid treatment solution, operate the magnetic mass in a demagnetized state at a position other than the first position, and maintain the rod in the acid treatment solution for a predetermined duration less than 10 minutes.

In an illustrative aspect, a targeted magnetic impurity extraction method may include capture magnetic impurities from a battery slurry at an exterior surface of an elongated rod extending along a longitudinal axis and may include a magnetically permeable sheath and a magnetic mass disposed at a distal end of the elongated rod. For example, the magnetic mass selectively may translate along a curvilinear path within the magnetically permeable sheath. For example, the magnetically permeable sheath may include a variable thickness along the longitudinal axis. For example, at a first position may include the distal end of the elongated rod, an effective magnetic field at the exterior surface of the magnetically permeable sheath varies from at least a first strength capable of attracting paramagnetic impurities to a second strength smaller than the first strength.

For example, in response to a signal indicating magnetic impurities are captured at the exterior surface of the magnetically permeable sheath, initiate a rinsing process by operating the elongated rod into a rinsing container may include a rinsing liquid. For example, the method may include operate the magnetic mass and the elongated rod in at least one rinsing cycle, each may include a release step and a recapture step. For example, for an i-th cycle of the at least one cycle, the release step may include translate the magnetic mass in an i-th release position. For example, the effective magnetic field at an exterior surface of the magnetically permeable sheath may be less than the first strength. For example, the release step may include shake the elongated rod simultaneously for an i-th predetermined first duration.

For example, the recapture step may include reposition the magnetic mass at the first position. For example, the recapture step may include move the elongated rod to an i-th predetermined recapture position and hold for an i-th predetermined second duration. For example, a target magnetic material may be recaptured.

For example, the at least one rinsing cycle may include at least three cycles.

The targeted magnetic impurity extraction method may include, in a capture process before the rinsing process, insert the elongated rod into a mixing container. For example, perform a preset capture motion may include translate the magnetic mass to the first position. For example, perform a preset capture motion may include move the elongated rod around the mixing container along a predetermined path at a predetermined speed for a predetermined duration. For example, the magnetic impurities in the battery slurry may be captured on the exterior of the magnetically permeable sheath.

The targeted magnetic impurity extraction method may include, before translating the magnetic mass to the first position. For example, the targeted magnetic impurity extraction method may include operate the magnetic mass in a demagnetized state at a position other than the first position, For example, the targeted magnetic impurity extraction method may include rotate the elongated rod at a diameter about the central axis. For example, battery materials and dispersant of the slurry are mixed.

The targeted magnetic impurity extraction method may include, after the rinsing process, insert the elongated rod into an acid treatment solution, operate the magnetic mass in a demagnetized state at a position other than the first position, and maintain the elongated rod in the acid treatment solution for a predetermined duration less than 10 minutes.

The targeted magnetic impurity extraction method may include select the i-th predetermined first duration, the i-th predetermined second duration, the predetermined path, and the predetermined speed based on non-target substances expected in the battery slurry.

The targeted magnetic impurity extraction method, after the rinsing process, may include operate the elongated rod to a vacuum filtration station. For example, the targeted magnetic impurity extraction method may include position the magnetic mass to a second position. For example, the magnetic field at the exterior of the magnetically permeable sheath may be removed. For example, the targeted magnetic impurity extraction method may include apply a dispersing solution onto the elongated rod. For example, the targeted magnetic impurity extraction method may include receive a sample solution at a conductive paper may include the dispersing solution and target impurities captured on the elongated rod. For example, the target impurities are captured at a top surface of the conductive paper. For example, the targeted magnetic impurity extraction method may include dry the conductive paper for a third predetermined duration. For example, the targeted magnetic impurity extraction method may include directly transfer the conductive paper to a subsequent analysis machine.

For example, the conductive paper may include an inherently conductive material.

For example, the conductive paper may include a graphene filter paper and a gold coating.

For example, the conductive paper may include a non-conductive membrane with a thickness of less than 10 microns. For example, transfer the non-conductive membrane to the subsequent analysis machine, the non-conductive membrane may be combined with a conductive layer at a bottom surface of the non-conductive membrane. For example, the non-conductive membrane becomes conductive when it may be transferred to the subsequent analysis machine.

For example, the dispersing solution may include at least 70% alcohol.

For example, the dispersing solution may include at least 50% alcohol.

In an illustrative aspect, a targeted magnetic impurity extraction method may include (a) in response to a signal indicating magnetic impurities are captured by an elongated rod, initiate a rinsing process. For example, the elongated rod may include a magnetically permeable sheath encapsulates a magnetic mass disposed at a distal end of the elongated rod. For example, the elongated rod captures the magnetic impurities, and may be inserted into a sonication container.

For example, the targeted magnetic impurity extraction method may include (b) determine a sequence of sonic waves to be applied to the rod based on a sonication profile may include, for each sonic wave of the sequence, a sonic wave frequency and a duration. For example, the targeted magnetic impurity extraction method may include (d) apply a first sonic wave frequency to the rod for a first duration. For example, the targeted magnetic impurity extraction method may include (e) apply a next sonic wave frequency to the rod for a next duration. For example, the targeted magnetic impurity extraction method may include (f) repeat (e) until the sequence of sonic waves may be completed. For example, the sequence of sonic waves may include at least two sonic wave frequencies between 20 Hz and 100 Hz. For example, non-target impurities of the magnetic impurities are knocked off from the elongated rod.

In an illustrative aspect, a battery slurry mixing device may include a motor. For example, the battery slurry mixing device may include a tray. For example, the tray may include at least one container compartment distributed along a longitudinal axis and a side rail configured to guide the tray to releasably couple to the motor. For example, each container compartment may be configured to, when the tray may be detached from the motor, receive a slurry mixing vessel containing battery materials, dispersants, and impurities in an upright position. For example, a vertical axis of the slurry mixing vessel may be orthogonal to a gravitational gradient. For example, in operation, the tray may be releasably coupled to the motor. For example, the motor may agitate the tray according to a predetermined motion profile.

For example, the predetermined motion profile may include rotating the tray. For example, the vertical axis may be rotated about the longitudinal axis. For example, the predetermined motion profile may include temporarily stopping a movement of the tray when the vertical axis may be rotated 180 degrees for a predetermined duration.

The battery slurry mixing device may include a coupling rod configured to connect the tray and the motor. For example, when the movement of the tray may be temporarily stopped, the tray may be configured to oscillate at a predetermined angle for a predetermined duration based on a size of the coupling rod.

For example, the predetermined angle may be between 3° and 10°, and the predetermined duration may be less than 5 seconds.

For example, the tray may include at least three container compartments.

For example, the predetermined motion profile may include rotating the tray in both clockwise and counterclockwise directions.

For example, the predetermined motion profile further may include translation and vibration movements.

The battery slurry mixing device may include a locking unit configured to prevent the tray from being withdrawn from coupling when the tray couples with the motor.

For example, the motor may be operably coupled to an angular position sensor configured to detect a rotation state of the motor.

In an illustrative aspect, a slurry mixing system may include the battery slurry mixing device according to above. For example, the slurry mixing system may include a data store may include a program of instructions. For example, the slurry mixing system may include a processor operably coupled to the battery slurry mixing device, and the data store. For example, when the processor executes the program of instructions, the processor causes operations to be performed to automatically generate a homogenization of a battery slurry without causing agglomeration.

For example, the operations may include receive the slurry mixing vessel holding the battery slurry of the battery materials, the dispersants, and the impurities. For example, the operations may include, after the tray may be retracted to couple with the motor, in response to a begin signal, may agitate the tray based on the predetermined motion profile.

For example, the operations further may include select the predetermined motion profile based on mixing information may include a type, a concentration, and viscosity of the battery slurry.

For example, the operations further may include receive the mixing information from a scanning device configured to scan a tag coupled to the slurry mixing vessel.

For example, the operations further may include update the predetermined motion profile based on user feedback.

In an illustrative aspect, an impurity rinsing method may include insert an object into a container may include an acid treatment solution. For example, the object may include a target impurity of a battery material magnetically attracted at an exterior surface of the object, and the target impurity may include magnetic alloys. For example, the acid treatment solution may include nitric acid, hydrochloric acid, and sulfuric acid. For example, the method may include maintain the object in the acid treatment solution at a room temperature for less than a predetermined time less than 15 minutes. For example, the target impurity may be dissolved into the acid treatment solution.

For example, the object may include the magnetic impurity sample collection device according to above.

The impurity rinsing method may include add a base solution after the predetermined time. For example, a temperature in the container may be raised from the room temperature to a predetermined temperature by acid-base neutralization, and an acidity of a solution in the container may be reduced.

For example, the base solution may include ammonium hydroxide.

For example, the base solution may include sodium hydroxide.

For example, the room temperature may be less than 30° C.

For example, a weight ratio of the hydrochloric acid and the nitric acid ranges from 1:1 to 3:1.

For example, the acid treatment solution may include 0.4%-2% of the sulfuric acid.

For example, the acid treatment solution may be between 60-99% concentrated.

For example, collect the dissolved target impurity may include introduce a sampling rinse solution to the container, and transfer a final solution may include the dissolved target impurity, the acid treatment solution, and the sampling rinse solution to a conical tube.

For example, the sampling rinse solution may include ultrapure water.

For example, an amount of the sampling rinse solution added to the container may be determined based on the acid treatment solution. For example, the final solution may be adjusted to have a pH level compliant to a predetermined standard.

In an illustrative aspect, a battery material impurity assessment system may include an input port. For example, the battery material impurity assessment system may include a conveyor system. For example, the battery material impurity assessment system may include the slurry mixing system according to above. For example, the battery material impurity assessment system may include the first or second targeted magnetic impurity extraction system according above. For example, the battery material impurity assessment system may include a data store may include a program of instructions. For example, the battery material impurity assessment system may include a processor operably coupled to the conveyor system, the slurry mixing system, and the targeted magnetic impurity extraction system, and the data store. For example, when the processor executes the program of instructions, the processor causes operations to be performed to automatically extract target impurities from a battery material sample For example, the operations may include receive at the input port the battery material sample in a mixing container containing a dispersant solution. For example, the operations may include transfer, using the conveyor system, the mixing container to the slurry mixing system. For example, the operations may include operate the slurry mixing system on a battery slurry may include the battery material sample and the dispersant to generate a homogenization of the battery slurry. For example, the operations may include transfer, using the conveyor system, the mixing container to the targeted magnetic impurity extraction system. For example, the operations may include operate the targeted magnetic impurity extraction system to extract the target impurities from the homogenization of the battery slurry.

The battery material impurity assessment system may include a vacuum filtration station may include a funnel and a conductive paper. For example, the operations may include operate the rod to the vacuum filtration station. For example, the operations may include position the magnetic mass to a second position. For example, the magnetic field at the exterior of the magnetically permeable sheath may be removed. For example, the operations may include apply a dispersing solution onto the elongated rod. For example, the operations may include receive a sample solution at the conductive paper. For example, the sample solution may include the dispersing solution and target impurities captured on the rod. For example, the target impurities may be captured at a top surface of the conductive paper. For example, the operations may include dry the conductive paper for a third predetermined duration.

For example, the operations may include directly transfer the conductive paper to a subsequent analysis machine.

For example, the conductive paper may include an inherently conductive material.

For example, the conductive paper may include a graphene filter paper and a gold coating.

For example, the conductive paper may include a non-conductive membrane with a thickness of less than 10 microns. For example, transfer the non-conductive membrane to the subsequent analysis machine, the non-conductive membrane may be combined with a conductive layer at a bottom surface of the non-conductive membrane. For example, the non-conductive membrane becomes conductive when it may be transferred to the subsequent analysis machine.

For example, the dispersing solution may include at least 70% alcohol.

For example, the dispersing solution may include at least 50% alcohol.

A number of implementations have been described. Nevertheless, it will be understood that various modifications may be made. For example, advantageous results may be achieved if the steps of the disclosed techniques were performed in a different sequence, or if components of the disclosed systems were combined in a different manner, or if the components were supplemented with other components. Accordingly, other implementations are contemplated within the scope of the following claims.

What is claimed is:

1. A magnetic impurity sample collection device comprising:
   a movement module comprises a motor unit; and,
   a rod extending in a longitudinal axis coupled to the movement module comprises:
      a magnetic mass disposed at a distal end of the rod;
      a position control bar coupled to the movement module and the magnetic mass; and,
      a magnetically permeable sheath encapsulating the magnetic mass and the position control bar, wherein:
      the motor unit is configured to selectively translate the magnetic mass along a curvilinear path within the magnetically permeable sheath; and,
      the magnetically permeable sheath comprises a variable thickness along the longitudinal axis, such that, at the distal end of the rod corresponding to a first position of the magnetic mass, an effective magnetic field at an exterior surface of the magnetically permeable sheath varies from at least a first strength capable of attracting paramagnetic impurities to a second strength at a second position smaller than the first strength.

2. The magnetic impurity sample collection device of claim 1, wherein the movement module comprises a central axis, wherein the motor unit is configured to:
   translate the rod along a horizontal plane orthogonal to the longitudinal axis;
   translate the rod parallel to the longitudinal axis;
   circulate the rod along the horizontal plane at a diameter within a predetermined maximum diameter from the central axis; and,
   rotate the rod about the central axis.

3. The magnetic impurity sample collection device of claim 1, wherein the magnetically permeable sheath comprises a monotonically decreasing from a proximal end to the distal end of the rod.

4. The magnetic impurity sample collection device of claim 1, wherein the second position is determined to be above a predetermined fill level of a container after the rod is inserted into the container.

5. The magnetic impurity sample collection device of claim 1, wherein the variable thickness is less than 1.2 mm thick at the distal end of the rod.

6. The magnetic impurity sample collection device of claim 1, further comprising:
   a data store comprising a program of instructions; and,
   a processor operably coupled to the movement module of the magnetic impurity sample collection device configured to operate the motor unit, and the data store such that, when the processor executes the program of instructions, the processor causes operations to be performed to automatically extract a target magnetic substance from a battery slurry, the operations comprising:
      in response to a signal indicating magnetic impurities are captured at the exterior surface of the magnetically permeable sheath, initiate a rinsing process by operating the magnetic impurity sample collection device into a rinsing container comprising a rinsing liquid;
      operate the magnetic mass and the rod in at least one rinsing cycle, each comprising a release step and a recapture step, wherein, for an i-th cycle of the at least one rinsing cycle, the release step comprises:
         translate the magnetic mass to an i-th release position, such that the effective magnetic field at the exterior surface of the magnetically permeable sheath is less than the first strength; and,
         shake the rod for an i-th predetermined first duration; and,
      the recapture step comprises:
         reposition the magnetic mass at the first position; and,
         move the rod to an i-th predetermined recapture position and hold for an i-th predetermined second duration, such that a target magnetic material is recaptured.

7. The magnetic impurity extraction system of claim 6, wherein move the rod to at an i-th predetermined recapture position comprises tapping a bottom of the rinsing container.

8. The magnetic impurity extraction system of claim 6, wherein the movement module comprises a central axis, and wherein shake the rod comprises rotate the rod about the central axis in a predetermined speed.

9. The magnetic impurity extraction system of claim 6, further comprising:
   an input port; and
   a conveyor system;
   a slurry mixing system
   the processor operably coupled to the conveyor system, the slurry mixing system, and the magnetic impurity extraction system, and the data store such that, when the processor executes the program of instructions, the processor causes further operations to be performed to automatically extract target impurities from a battery material sample, the further operations comprising:
      receive at the input port the battery material sample in a mixing container containing a dispersant solution;
      transfer, using the conveyor system, the mixing container to the slurry mixing system;

operate the slurry mixing system on a battery slurry comprising the battery material sample and the dispersant to generate a homogenization of the battery slurry;

transfer, using the conveyor system, the mixing container to the magnetic impurity extraction system; and, operate the magnetic impurity extraction system to extract the target impurities from the homogenization of the battery slurry.

10. The magnetic impurity extraction system of claim 9, further comprising a vacuum filtration station comprising a funnel and a conductive paper, wherein the further operations further comprise:

operate the rod to the vacuum filtration station;

position the magnetic mass to a second position, such that the magnetic field at the exterior of the magnetically permeable sheath is removed;

apply a dispersing solution onto the elongated rod;

receive a sample solution at the conductive paper, wherein the sample solution comprises the dispersing solution and target impurities captured on the rod, such that the target impurities are captured at a top surface of the conductive paper;

dry the conductive paper for a third predetermined duration; and, directly transfer the conductive paper to a subsequent analysis machine.

11. The magnetic impurity extraction system of claim 6, wherein the operations further comprise, in a capture process before the rinsing process, insert the rod into a mixing container, and perform a preset capture motion comprising:

translate the magnetic mass to the first position; and, move the rod around the mixing container along a predetermined path at a predetermined speed for a predetermined duration, such that the magnetic impurities in the battery slurry is captured on the exterior of the magnetically permeable sheath.

12. The magnetic impurity extraction system of claim 11, wherein the movement module comprises a central axis, and wherein the operations further comprise, before translating the magnetic mass to the first position, operate the magnetic mass in a demagnetized state at the second position; and, rotate the rod at a diameter about the central axis, such that battery materials and dispersant of the slurry are mixed.

13. The magnetic impurity extraction system of claim 6, wherein the operations further comprise, after the rinsing process, insert the rod into an acid treatment solution, operate the magnetic mass in a demagnetized state at a position other than the first position, and maintain the rod in the acid treatment solution for a predetermined duration less than 10 minutes.

14. The magnetic impurity sample collection device of claim 1, further comprising:

a data store comprising a program of instructions; and, a processor operably coupled to the movement module of the magnetic impurity sample collection device configured to operate the motor unit, and the data store such that, when the processor executes the program of instructions, the processor causes operations to be performed to automatically extract a target magnetic substance from a battery slurry, the operations comprising:

(a) in response to a signal indicating magnetic impurities are captured at the exterior surface of the magnetically permeable sheath, initiate a rinsing process by operating the magnetic impurity sample collection device into a rinsing container comprising a rinsing liquid while maintaining the magnetic mass at the first position;

(b) determine a sequence of sonic waves to be applied to the rod based on a sonication profile comprises, for each sonic wave of the sequence, a sonic wave frequency and a duration;

(c) apply a first sonic wave frequency to the rod for a first duration;

(d) apply a next sonic wave frequency to the rod for a next duration; and, (e) repeat (d) until the sequence of sonic waves is completed, wherein the sequence of sonic waves comprises at least two sonic wave frequencies between 20 Hz and 100 Hz.

15. The magnetic impurity extraction system according to claim 14, wherein the operations further comprise, in a capture process before the rinsing process, insert the rod into a mixing container, and perform a preset capture motion comprising:

translate the magnetic mass to the first position; and, move the rod around the mixing container along a predetermined path at a predetermined speed for a predetermined duration, such that the magnetic impurities in the battery slurry is captured on the exterior of the magnetically permeable sheath.

16. The magnetic impurity extraction system of claim 15, wherein the movement module comprises a central axis, and wherein the operations further comprise, before translating the magnetic mass to the first position, operate the magnetic mass in a demagnetized state at the second position; and, rotate the rod at a diameter about the central axis, such that battery materials and dispersant of the slurry are mixed.

17. The magnetic impurity extraction system according to claim 14, wherein the operations further comprise, after the rinsing process, insert the rod into an acid treatment solution, operate the magnetic mass in a demagnetized state at a position other than the first position, and maintain the rod in the acid treatment solution for a predetermined duration less than 10 minutes.

18. A targeted magnetic impurity extraction method comprising:

capture magnetic impurities from a battery slurry at an exterior surface of an elongated rod extending along a longitudinal axis and comprising a magnetically permeable sheath and a magnetic mass disposed at a distal end of the elongated rod, wherein:

the magnetic mass selectively translates along a curvilinear path within the magnetically permeable sheath; and, the magnetically permeable sheath comprises a variable thickness along the longitudinal axis, such that, at a first position comprising the distal end of the elongated rod, an effective magnetic field at the exterior surface of the magnetically permeable sheath varies from at least a first strength capable of attracting paramagnetic impurities to a second strength smaller than the first strength;

in response to a signal indicating magnetic impurities are captured at the exterior surface of the magnetically permeable sheath, initiate a rinsing process by operating the elongated rod into a rinsing container comprising a rinsing liquid;

operate the magnetic mass and the elongated rod in at least one rinsing cycle, each comprising a release step and a recapture step, wherein, for an i-th cycle of the at least one cycle, the release step comprises:
- translate the magnetic mass in an i-th release position, such that the effective magnetic field at an exterior surface of the magnetically permeable sheath is less than the first strength; and,
- shake the elongated rod simultaneously for an i-th predetermined first duration; and, the recapture step comprises:
- reposition the magnetic mass at the first position; and,
- move the elongated rod to an i-th predetermined recapture position and hold for an i-th predetermined second duration, such that a target magnetic material is recaptured.

19. The targeted magnetic impurity extraction method of claim 18, wherein the at least one rinsing cycle comprises at least three cycles.

20. The targeted magnetic impurity extraction method of claim 18, further comprises, in a capture process before the rinsing process, insert the elongated rod into a mixing container, and perform a preset capture motion comprising:
- translate the magnetic mass to the first position; and,
- move the elongated rod around the mixing container along a predetermined path at a predetermined speed for a predetermined duration, such that the magnetic impurities in the battery slurry is captured on the exterior of the magnetically permeable sheath.

21. The targeted magnetic impurity extraction method of claim 20, further comprises, before translating the magnetic mass to the first position,
- operate the magnetic mass in a demagnetized state at a position other than the first position; and,
- rotate the elongated rod at a diameter about a central axis, such that battery materials and dispersant of the slurry are mixed.

22. The targeted magnetic impurity extraction method of claim 20, further comprises select the i-th predetermined first duration, the i-th predetermined second duration, the predetermined path, and the predetermined speed based on non-target substances expected in the battery slurry.

23. The targeted magnetic impurity extraction method of claim 18, further comprises, after the rinsing process, insert the elongated rod into an acid treatment solution, operate the magnetic mass in a demagnetized state at a position other than the first position, and maintain the elongated rod in the acid treatment solution for a predetermined duration less than 10 minutes.

24. The targeted magnetic impurity extraction method of claim 18, after the rinsing process, further comprises:
- operate the elongated rod to a vacuum filtration station;
- position the magnetic mass to a second position, such that the magnetic field at the exterior of the magnetically permeable sheath is removed;
- apply a dispersing solution onto the elongated rod;
- receive a sample solution at a conductive paper comprising the dispersing solution and target impurities captured on the elongated rod, such that the target impurities are captured at a top surface of the conductive paper;
- dry the conductive paper for a third predetermined duration; and,
- directly transfer the conductive paper to a subsequent analysis machine.

25. The targeted magnetic impurity extraction method of claim 24, wherein the conductive paper comprises conductive material.

26. The targeted magnetic impurity extraction method of claim 24, wherein the conductive paper comprises a non-conductive membrane with a thickness of less than 10 microns, wherein, transfer the non-conductive membrane to the subsequent analysis machine, the non-conductive membrane is combined with a conductive layer at a bottom surface of the non-conductive membrane, such that the non-conductive membrane becomes conductive when it is transferred to the subsequent analysis machine.

27. The targeted magnetic impurity extraction method of claim 24, wherein the dispersing solution comprises at least 70% alcohol.

28. The targeted magnetic impurity extraction method of claim 24, wherein the dispersing solution comprises at least 50% alcohol.

* * * * *